(12) United States Patent
Monteiro et al.

(10) Patent No.: US 7,080,153 B2
(45) Date of Patent: Jul. 18, 2006

(54) MULTICASTING METHOD AND APPARATUS

(75) Inventors: Antonio M Monteiro, New York, NY (US); James F Butterworth, New York, NY (US)

(73) Assignee: Two Way Media LLC, Vail, CO (US)

( * ) Notice: Subject to any disclaimer, the term of this patent is extended or adjusted under 35 U.S.C. 154(b) by 114 days.

(21) Appl. No.: 10/839,526

(22) Filed: May 4, 2004

(65) Prior Publication Data

US 2004/0255148 A1    Dec. 16, 2004

Related U.S. Application Data

(63) Continuation of application No. 10/180,590, filed on Jun. 26, 2002, which is a continuation of application No. 09/617,647, filed on Jul. 17, 2000, now Pat. No. 6,434,622, which is a continuation of application No. 09/435,732, filed on Nov. 8, 1999, now Pat. No. 6,119,163, which is a continuation of application No. 09/110,369, filed on Jul. 6, 1998, now Pat. No. 5,983,005, which is a continuation of application No. 08/644,072, filed on May 9, 1996, now Pat. No. 5,778,187.

(51) Int. Cl.
    *G06F 15/16* (2006.01)
(52) U.S. Cl. .................................. 709/231; 709/238
(58) Field of Classification Search ................ 709/231, 709/238
    See application file for complete search history.

(56) References Cited

U.S. PATENT DOCUMENTS 2,674,512 A    4/1954  Bogert et al.
2,957,046 A   10/1960  Freeman et al.
3,126,513 A    3/1964  Kamen
3,230,302 A    1/1966  Bruck et al.
3,368,031 A    2/1968  Eisele et al.
3,733,430 A    5/1973  Thompson et al.
3,849,729 A   11/1974  Baggen (Continued)

FOREIGN PATENT DOCUMENTS

EP    9792464 B    6/2004

(Continued)

OTHER PUBLICATIONS

"Structured Video", GCL's Proposal for DAVIC, Graphics Communications Laboratories, Dec. 1994.

(Continued)

*Primary Examiner*—Thomas R. Peeso
(74) *Attorney, Agent, or Firm*—Morgan, Lewis & Bockius LLP

(57) ABSTRACT

A scalable architecture is disclosed for delivery of real-time information over a communications network. Embedded into the architecture is a control mechanism that provides for the management and administration of users who are to receive the real-time information. In the preferred embodiment, the information being delivered is high-quality audio. However, it could also be video, graphics, text or any other type of information that can be transmitted over a digital network. Preferably, there are multiple channels of information available simultaneously to be delivered to users, each channel consisting of an independent stream of information. A user chooses to tune in or tune out a particular channel, but does not choose the time at which the channel distributes its information. Advantageously, interactive (two-way) information can be incorporated into the system, multiple streams of information can be integrated for delivery to a user, and certain portions of the information being delivered can be tailored to the individual user.

135 Claims, 23 Drawing Sheets

U.S. PATENT DOCUMENTS

| | | |
|---|---|---|
| 4,245,245 A | 1/1981 | Matsumoto et al. |
| 4,264,924 A | 4/1981 | Freeman |
| RE31,639 E | 7/1984 | Nicholson |
| 4,546,382 A | 10/1985 | McKenna et al. |
| 4,558,358 A | 12/1985 | Onda |
| 4,602,279 A | 7/1986 | Freeman |
| 4,816,904 A | 3/1989 | McKenna et al. |
| 4,829,569 A | 5/1989 | Seth-Smith et al. |
| 4,850,007 A | 7/1989 | Marino et al. |
| 5,027,400 A | 6/1991 | Baji et al. |
| 5,081,680 A | 1/1992 | Bennett |
| 5,105,184 A | 4/1992 | Pirani et al. |
| 5,132,992 A | 7/1992 | Yurt et al. |
| 5,155,591 A | 10/1992 | Wachob |
| 5,155,762 A | 10/1992 | Croquet et al. |
| 5,195,086 A | 3/1993 | Baumgartner et al. |
| 5,220,420 A | 6/1993 | Hoarty et al. |
| 5,220,501 A | 6/1993 | Lawlor et al. |
| 5,231,494 A | 7/1993 | Wachob |
| 5,245,429 A | 9/1993 | Virginio et al. |
| 5,251,324 A | 10/1993 | McMullan, Jr. |
| 5,267,032 A | 11/1993 | Van Cang |
| 5,283,639 A | 2/1994 | Esch et al. |
| 5,283,731 A | 2/1994 | Lalonde et al. |
| 5,289,271 A | 2/1994 | Watson |
| 5,305,195 A | 4/1994 | Murphy |
| 5,309,433 A | 5/1994 | Cidon et al. |
| 5,319,455 A * | 6/1994 | Hoarty et al. ............... 725/34 |
| 5,347,304 A | 9/1994 | Moura et al. |
| 5,347,632 A | 9/1994 | Filepp et al. |
| 5,353,218 A | 10/1994 | De Lapa et al. |
| 5,355,371 A | 10/1994 | Auerback et al. |
| 5,361,091 A | 11/1994 | Hoarty et al. |
| 5,361,256 A | 11/1994 | Doeringer et al. |
| 5,371,532 A | 12/1994 | Gelman et al. |
| 5,387,927 A | 2/1995 | Look et al. |
| 5,410,698 A | 4/1995 | Danneels et al. |
| 5,412,416 A | 5/1995 | Nemirofsky |
| 5,414,773 A | 5/1995 | Handelman |
| 5,418,559 A | 5/1995 | Blahut |
| 5,421,024 A | 5/1995 | Faulk, Jr. et al. |
| 5,422,674 A | 6/1995 | Hooper et al. |
| 5,424,770 A | 6/1995 | Schmelzer et al. |
| 5,426,637 A | 6/1995 | Derby et al. |
| 5,428,606 A | 6/1995 | Moskowitz |
| 5,430,716 A | 7/1995 | Pawelski |
| 5,432,542 A | 7/1995 | Thibadeau et al. |
| 5,440,548 A | 8/1995 | Denissen |
| 5,442,390 A | 8/1995 | Hooper et al. |
| 5,446,489 A | 8/1995 | Egendorf |
| 5,446,490 A | 8/1995 | Blahut et al. |
| 5,446,919 A | 8/1995 | Wilkins |
| 5,453,779 A | 9/1995 | Dan et al. |
| 5,455,619 A | 10/1995 | Truckenmiller et al. |
| 5,459,725 A | 10/1995 | Bodner et al. |
| 5,481,297 A | 1/1996 | Cash et al. |
| 5,485,464 A | 1/1996 | Strodtbeck et al. |
| 5,488,408 A | 1/1996 | Maduzia et al. |
| 5,493,514 A | 2/1996 | Keith et al. |
| 5,497,502 A | 3/1996 | Castille |
| 5,508,732 A | 4/1996 | Bottomley et al. |
| 5,515,098 A | 5/1996 | Carles |
| 5,517,494 A | 5/1996 | Green |
| 5,521,927 A | 5/1996 | Kim et al. |
| 5,532,732 A * | 7/1996 | Yuen et al. ............... 725/20 |
| 5,555,244 A | 9/1996 | Gupta et al. |
| 5,559,549 A | 9/1996 | Hendricks et al. |
| 5,559,999 A | 9/1996 | Maturi et al. |
| 5,574,963 A * | 11/1996 | Weinblatt et al. ......... 455/2.01 |
| 5,588,029 A | 12/1996 | Maturi et al. |
| 5,592,486 A | 1/1997 | Lo et al. |
| 5,594,732 A | 1/1997 | Bell et al. |
| 5,600,364 A * | 2/1997 | Hendricks et al. ............ 725/9 |
| 5,604,562 A | 2/1997 | Dedrisk |
| 5,610,920 A | 3/1997 | Doll et al. |
| 5,617,565 A | 4/1997 | Augenbraun et al. |
| 5,634,334 A | 6/1997 | Hehl |
| 5,636,346 A | 6/1997 | Saxe |
| 5,649,013 A | 7/1997 | Stuckey et al. |
| 5,652,615 A | 7/1997 | Bryant et al. |
| 5,652,749 A | 7/1997 | Davenport |
| 5,666,487 A | 9/1997 | Goodman et al. |
| 5,671,226 A | 9/1997 | Murakami et al. |
| 5,673,254 A | 9/1997 | Crayford |
| 5,675,510 A | 10/1997 | Coffey et al. |
| 5,694,334 A | 12/1997 | Donahue et al. |
| 5,706,290 A | 1/1998 | Shaw et al. |
| 5,715,336 A | 2/1998 | Tanaka |
| 5,717,923 A | 2/1998 | Dedrick |
| 5,727,002 A | 3/1998 | Miller et al. |
| 5,734,719 A | 3/1998 | Tsevdos et al. |
| 5,745,837 A | 4/1998 | Fuhrmann |
| 5,751,336 A | 5/1998 | Aggarwal et al. |
| 5,760,838 A | 6/1998 | Adams et al. |
| 5,771,073 A | 6/1998 | Lim |
| 5,774,664 A | 6/1998 | Hidary et al. |
| 5,778,182 A | 7/1998 | Cathey et al. |
| 5,778,187 A | 7/1998 | Monteiro et al. |
| 5,790,541 A | 8/1998 | Patrick et al. |
| 5,793,980 A | 8/1998 | Glaser et al. |
| 5,812,545 A | 9/1998 | Liebowitz et al. |
| 5,838,683 A | 11/1998 | Corley et al. |
| 5,848,396 A | 12/1998 | Gerace |
| 5,862,329 A | 1/1999 | Aras et al. |
| 5,872,588 A | 2/1999 | Aras et al. |
| 5,878,384 A | 3/1999 | Johnson et al. |
| 5,892,535 A | 4/1999 | Allen et al. |
| 5,894,480 A | 4/1999 | Hoffert et al. |
| 5,923,853 A | 7/1999 | Danneels |
| 5,928,331 A | 7/1999 | Bushmitch |
| 5,930,254 A | 7/1999 | Liron et al. |
| 5,930,493 A | 7/1999 | Ottesen et al. |
| 5,931,961 A | 8/1999 | Ranganathan et al. |
| 5,936,940 A | 8/1999 | Marin et al. |
| 5,953,340 A | 9/1999 | Higgins |
| 5,960,006 A | 9/1999 | Maturi |
| 5,983,005 A | 11/1999 | Monteiro et al. |
| 6,002,393 A | 12/1999 | Hite et al. |
| 6,005,560 A | 12/1999 | Gill et al. |
| 6,009,096 A | 12/1999 | Jaisingh et al. |
| 6,115,750 A | 9/2000 | Dillon et al. |
| 6,119,163 A | 9/2000 | Monteiro et al. |
| 6,122,668 A | 9/2000 | Teng et al. |
| 6,208,656 B1 | 3/2001 | Hrastar et al. |
| 6,434,622 B1 | 8/2002 | Monteiro et al. |
| 6,539,022 B1 | 3/2003 | Virgile |
| 6,560,707 B1 | 5/2003 | Curtis et al. |
| 2003/0140159 A1 | 7/2003 | Campbell et al. |

FOREIGN PATENT DOCUMENTS

| | | |
|---|---|---|
| WO | WO 95/15658 | 6/1995 |

OTHER PUBLICATIONS

"Multimedia Retrieval Services: Teletel Architecture as an example and a basis for future evolutions", Joint Proposal for the First DAVIC CFP, The Digital Audio-Visual Council, DAVIC Meeting, Tokyo, Japan, Dec. 4-7, 1994.

CableLabs® Response to DAVIC's CFP, Nov. 23, 2994.

Fong, Dr. Chung-Bin, et al., "Karaoke-On-Demand Service & System to DAVIC", Dec. 4, 1994.

Robinson, David, et al., "Network Management Video Server System MIB", The Digital Audio-Visual Council (DAVIC), Dec. 8, 1994.
Thompson, John et al., "Response from British Telecommunications Plc to: DAVIC's First Call for Proposals", BT Response to DAVIC/100, Issue 2.0, Oct. 14, 1994.
Peter H. Lewis, "Peering out a 'Real Time' Window", *New York Times*, Feb. 8, 1995, pp. D1, D7.
David Lawrence, "Real-Time Audio, Hi-Fi, it Ain't", *Web Developer*, vol. 1, No. 1, Oct. 1995.
Harry A. Jessell, "EZ sees money in the Net", *Broadcasting & Cable*, Jul. 31, 1995, p. 31.
Brett Atwood, "Global 'Desktop B'casting' Catches On", *Billboard*, Jun. 10, 1995.
Brett Atwood, "KPIG First 24-Hour Online Radio", *Billboard*, Sep. 2, 1995.
Donna Petrazzella, "ABC Radio enters WWW", *Broadcasting & Cable*, Aug. 21, 1995, p. 38.
P. Grillo et al., "Host Resources MIB", Network Working Group, RFC 1514, Sep. 1993.
S. Kille et al., "Network Services Monitoring MIB", Network Working Group RFC 1565, Jan. 1994.
K. McCloghrie et al., "Management Information Base for Network Management of TCP/IP-based Internets", Network Working Group, RFC 1156, May 1990.
J. Case et al., "A Simple Network Management Protocol (SNMP)", Network Working Group RFC 1157, May 1990.
Vashaspathi et al. Multicasting Routing for Multimedia Communication, *IEEE/ACM Transactions on Networking*, vol. 1, No. 3, Jun. 1993, pp. 286-292.
Almeroth et al., "Collecting and Modeling the Join/Leave Behavior of Multicast Group Members in the MBONE", *IEEE Proceedings of HPDC-5 '96*, May 1996, pp. 209-216.
Park et al., "Fault-tolerant Real-Time Synchronous collaboration environment using WWW", *IEEE*, 1996, pp. 226-231.
Pullen, Synchronous Distance Education Via the Internet, FIE '96, Proceedings, *IEEE*, 1996, pp. 285-288.
Munzner, "Visualizing the global topology of the MBONE", *IEEE*, 1996, pp. 85-92 and 129.
Shin, "Internet Multimedia Application Technologies Current Practice and future Directions", *IEEE* 1996, p. 225.
Chadda et al., "A Frame-work for Live Multicast of Video Streams Over the Internet", *IEEE* 1996, pp. 1-4.
Macedonia et al., "MBone Provides Audio and Video Across the Internet", *Computer*, Apr. 1994, pp. 30-35.
*Two-Way Media v. America Online*, Defendant America Online, Inc.'s Answer to the Complaint and Counterclaim, Civil Action No. C-04-089, S.D. Texas, May 20, 2004.
*Two-Way Media v. America Online*, Order, Civil Action No. C-04-089, S.C. Texas, Jun. 9, 2004.
U.S. Appl. No. 90/007,054, Order Granting/Denying Request for Ex Parte Reexamination, mailed Jun. 23, 2004.
U.S. Appl. No. 90/007,055, Order Granting/Denying Request for Ex Parte Reexamination, mailed Jun. 23, 2004.
U.S. Appl. No. 90/007,056, Order Granting/Denying Request for Ex Parte Reexamination, mailed Jun. 24, 2004.
*Two-Way Media LLC v. America Online, Inc.*, Civil Action No. C-04-089, S.D. Texas, Complaint, Mar. 9, 2004.
Singru, et al., "Framework for Interactive Video-on-Demand Service," Computers and Communications, Conference and Proceedings of the IEEE 14th Annual International Phoenix Conference on Scottsdale, AZ (Mar. 28-31, 1995), pp. 636-642.
U.S. Appl. No. 10/180,590, filed Jun. 26, 2002, Monteiro et al.
Netradio Corp. to offer customized broadcasts with ads, http://global.factiva.com/en/arch/print_results.asp, last visited Oct. 10, 2003.
News to the desktop: Vendors deliver personalized news to users via the Net, http://global.factiva.com/en/arch/print_results.asp, last visited Oct. 10, 2003.
Netcast Pairs Audio with Advertising, http://global.factiva.com/en/arch/print_results.asp, last visited Oct. 10, 2003.
Xing Takes on Progressive Networks in Internet Audio, Video Transmission with Streamworks, Tries Radio First, http://global.factiva.com/en/arch/print_results.asp, last visited Oct. 10, 2003.
K. Savetz et al. MBONE Multicasting Tomorrow's Internet (IDG Books worldwide Inc., 1996).
D.P. Brutzman et al., "MBONE Provides Audio and Video Across the Internet,"IEEE Computer, vol. 27, No. 4, pp. 30-36 (Apr. 1994).
PCT International Search Report, International Application No. PCT/US97/07893.
RealAudio Server, Administrator's Guide, Release 2.0. Progressive Networks, Inc.
RealAudio, Administrator's Guide, Release 1.1.
RealAudio Signs Deal with Netscape—Apr. 12, 1995.
Progressive Networks ships RealAudio—Jul. 25, 1995.
Microsoft, Spry and Spryglass to include RealAudio—Apr. 12, 1995.
April Bundles Real Audio Player—Aug. 7, 1995.
24-Hour ABC News on the Net—Aug. 15, 1995.
Ziff-Davis Adds RealAudio to ZD Net—Aug. 16, 1995.
Progressive Network's RealAudio Player has exclusive with Microsoft's Internet Explorer—Aug. 17, 1995.
Progressive Network's Announces "Live RealAudio" System—Aug. 30, 1995.
ABC RadioNet first to fully integrate live RealAudio—Sep. 7, 1995.
RTHK pioneers the use of LIVE RealAudio technology, Sep. 14, 1995.
Progressive Networks Announces RealAudio Personal Server—Oct. 9, 1995.
Progressive networks Receives Second Round of External Financing $5.7 Million Led by Accel partners—Oct. 30, 1995.
CheckPoint Software Breaks the Sound Barrier with Integrated Support for RealAudio—Dec. 5, 1995.
Progressive Networks Introduces Version 2.0 of the RealAudio System—Oct. 30, 1995.
Atlantic Records, CDnow, Electra Records, In Touch Group Inc., MCA Records, Muzak and Warner Bros. Records among first users of Progressive Network's Real Audio version 2.0—Dec. 4, 1995.
Progressive Networks to broadcast the Live and In Concert—Jan. 4, 1996.
Microsoft and Progressive Networks demonstrate first OLE-enabled Internet browser to incorporate RealAudio—Dec. 7, 1995.
Progressive Networks Announces RealAudio Server Products for Macintosh—Jan. 10, 1996.
Trusted Information Systems Enhances Industry Leading Gauntlet Internet Firewall—Jan. 23, 1996.
Border Network Technologies Provides Secure Support for RealAudio—Jan. 24, 1996.
Progressive Networks Announces Open RealAudio Architecture—Jan. 31, 1996.
RealAudio™ Server Software to be Bundled with newest Line of Apple Internet Servers—Feb. 27, 1996.

Bruce Jacobsen named President and Chief Operating Officer of Progressive Networks—Feb. 21, 1996.

GTA Announces RealAudio Support for the GFX Internet Firewall System—Mar. 1, 1996.

Morning Star's SecureConnect Technology Provides Internet Users of Real Audio with Sound Security—Mar. 4, 1996.

Progressive Networks and Microsoft Announce Streaming Media Agreement—Mar. 12, 1996.

Progressive Networks Announces RealAudio Firewall Proxy Kit—Apr. 2, 1996.

Progressive Networks Launches RealAudio 2.0 Intranet Offerings with Corporate Licensing Program and Intranet Server Pricing—Apr. 2, 1996.

Progressive Networks Ships Final Version of RealAudio System 2.0 with Open Architecture Enhancements and Ability to Deliver Synchronized Multimedia Capabilities—Apr. 2, 1996.

Progressive Networks Launches Timecast: The RealAudio Guide—Apr. 29, 1996.

RealAudio Winds Internet World magazine Outstanding Software Product of the Year Aware—Apr. 30, 1996.

S. Casner & S. Deering, "First IETF Internet Audiocast," ACM SIGCOMM Computer Communications Review, vol. 22, No. 3 (Jul. 1992).

S. Casner, "Getting on the MBone, Videoconferencing Over the Internet," University of Southern California, Information Sciences Institute, NLUUG Spring Conference (Apr. 13, 1995).

S. Deering, "IP Multicast and the MBone: Enabling Live, Multiparty, Multimedia Communication on the Internet," Xerox Palo Alto Research Center (Dec. 1995).

H. Eriksson, "MBONE: The Multicast Backbone," Communications of the ACM, vol. 37, No. 8, pp. 54-60 (Aug. 1994).

V. Jacobson, "The MBone—Interactive Multimedia on the Internet," University of California at Berkeley Seminar (Feb. 17, 1995).

K. Jonas & R. Wetekam, "Multicast Protocols for Multimedia Applications," 3rd International Workshop on Protocols for Multimedia Systems (PROMS'96), Madrid, Spain (Oct. 15-18, 1996).

J. Pasqual et al., "The multimedia multicast channel," Internetworking: Research and Experience, Wiley Publishers, vol. 5, No. 4, pp. 151-162 (Dec. 1994).

H. Schulzrinne et al., "RTP: A Transport Protocol for Real-Time Applications," Network Working Group, Audio-Video Transport Working Group, Request for Comments (Proposed Standard) 1889, Internet Engineering Task Force (Jan. 1996).

H. Schulzrinne, "When can we unplug the radio and telephone?," Network and Operating System Support for Digital Audio and Video, 5th International Workshop, NOSSDAV '95, Durham, New Hampshire, USA, Proceedings, Session V: Audio and Video Systems, pp. 174-177 (Apr. 19-21, 1995).

Robinson and Hooper, "A MIB for Video Server System Management," Proceedings of the 2nd International Workshop on Community Networkin Integrated Multipmedia Services in the Home (Cat No. TH8097; pp. 109-115) IEEE. Princeton, N.J., Jun. 20-22, 1995.

Stevens, R., "TCP/IP Illustrated, vol. 1: The Protocols," *SNMP*, pp. 309, 360-361, 385-386.

RealAudio, Administrator's Guide, Release 1.01.

* cited by examiner

| REQUEST FROM | REQUEST TO | VALIDATION WITH |
|---|---|---|
| USER | CONTROL SERVER | ADMINISTRATION SERVER |
| USER | MEDIA SERVER | CONTROL SERVER |
| MEDIA SERVER | MEDIA SERVER | CONTROL SERVER |
| MEDIA SERVER | PRIMARY SERVER | ADMINISTRATION SERVER |
| MEDIA SERVER | CONTROL SERVER | ADMINISTRATION SERVER |
| CONTROL SERVER | MEDIA SERVER | ADMINISTRATION SERVER |

(SHOWN ABOVE)

FIG. 9B

Key Pull-Down Menus on Main User Screen

MULTICASTING METHOD AND APPARATUS

The present application is a continuation of and claims priority to U.S. patent application Ser. No. 10/180,590, filed Jun. 26, 2002, which application is a continuation of U.S. patent application Ser. No. 09/617,647, filed Jul. 17, 2000, now U.S. Pat. No. 6,434,622, which application is a continuation of U.S. patent application Ser. No. 09/435,732, filed Nov. 8, 1999, now U.S. Pat. No. 6,119,163, which application is a continuation of U.S. patent application Ser. No. 09/110,369, filed Jul. 6, 1998, now U.S. Pat. No. 5,983,005, which application is a continuation of U.S. patent application Ser. No. 08/644,072, filed May 9, 1996, now U.S. Pat. No. 5,778,187, all of which are incorporated herein by reference in their entirety.

FIELD OF THE INVENTION

This relates to a method and apparatus for providing audio and/or visual communication services, in real-time to a multiplicity of identifiable users on a communications network, such as the Internet. In a preferred embodiment, the invention monitors which users are receiving signals on which one of a plurality of channels and modifies the content of at least some signals in response thereto. A particular application is to provide services akin to multi-channel radio or television with commercial programming content adjusted in accordance with the identity of the individual user.

BACKGROUND OF THE INVENTION

Systems such as the Internet typically are point-to-point (or unicast) systems in which a message is converted into a series of addressed packets that are routed from a source node through a plurality of routers to a destination node. In most communication protocols the packet includes a header that contains the addresses of the source and the destination nodes as well as a sequence number that specifies the packet's order in the message.

In general, these systems do not have the capability of broadcasting a message from a source node to all the other nodes in the network because such a capability is rarely of much use and could easily overload the network. However, there are situations where it is desirable for one node to communicate with some subset of all the nodes. For example, multi-party conferencing capability, analogous to that found in the public telephone system and broadcasting to a limited number of nodes, is of considerable interest to users of packet-switched networks. To satisfy such demands, packets destined for several recipients have been encapsulated in a unicast packet and forwarded from a source to a point in a network where the packets have been replicated and forwarded on to all desired recipients. This technique is known as IP Multicasting and the network over which such packets are routed is referred to as the Multicast Backbone or MBONE. More recently, routers have become available that can route the multicast addresses (class D addresses) provided for in communication protocols such as TCP/IP and UDP/IP. A multicast address is essentially an address for a group of host computers who have indicated their desire to participate in that group. Thus, a multicast packet can be routed from a source node through a plurality of multicast routers (or mrouters) to one or more devices receiving the multicast packets. From there the packet is distributed to all the host computers that are members of the multicast group.

These techniques have been used to provide on the Internet audio and video conferencing as well as radio-like broadcasting to groups of interested parties. See, for example, K. Savetz et al. MBONE Multicasting Tomorrow's Internet (IDG Books WorldWide Inc., 1996).

Further details concerning technical aspects of multicasting may be found in the Internet documents Request for Comments (RFC) 1112 and 1458, which are reproduced at Appendices A and B of the Savetz book and in D. P. Brutaman et al., "MBONE provides Audio and Video Across the Internet," IEEE Computer, Vol. 27, No. 4, pp. 30–36 (April 1994), all of which are incorporated herein by reference.

Citation of the foregoing documents is not to be construed as an admission that any of such documents is a prior art publication relative to the present invention.

SUMMARY OF THE INVENTION

The present invention is a scalable architecture for delivery of real-time information over a communications network. Embedded into the architecture is a control mechanism that provides for the management and administration of users who are to receive the real-time information.

In the preferred embodiment, the information being delivered is high-quality audio. However, it could also be video, graphics, text or any other type of information that can be transmitted over a digital network. This information is delivered in real-time to any number of widely distributed users. It is real-time in that for a given channel of information, approximately the same information is being sent at approximately the same time to everyone who is enabled to receive the information.

Preferably, there are multiple channels of information available simultaneously to be delivered to users, each channel consisting of an independent stream of information. A user chooses to tune in or tune out a particular channel, but does not choose the time at which the channel distributes its information. Advantageously, interactive (two-way) information can be incorporated into the system, multiple streams of information can be integrated for delivery to a user, and certain portions of the information being delivered can be tailored to the individual user.

BRIEF DESCRIPTION OF THE DRAWINGS

These and other objects, features and advantages of our invention will be more readily apparent from the following Detailed Description of a Preferred Embodiment of our invention in which:

FIGS. 6, 7, 8A–8C, 9A, 9B, 10–15, 16A, 16B, 17 are timing diagrams that depict various aspects of the operation of the system of FIG. 1.

Where the same reference numerals appear in multiple drawings, the numerals refer to the same or corresponding structure in such drawings.

DETAILED DESCRIPTION OF THE PREFERRED EMBODIMENT

Figure 1:
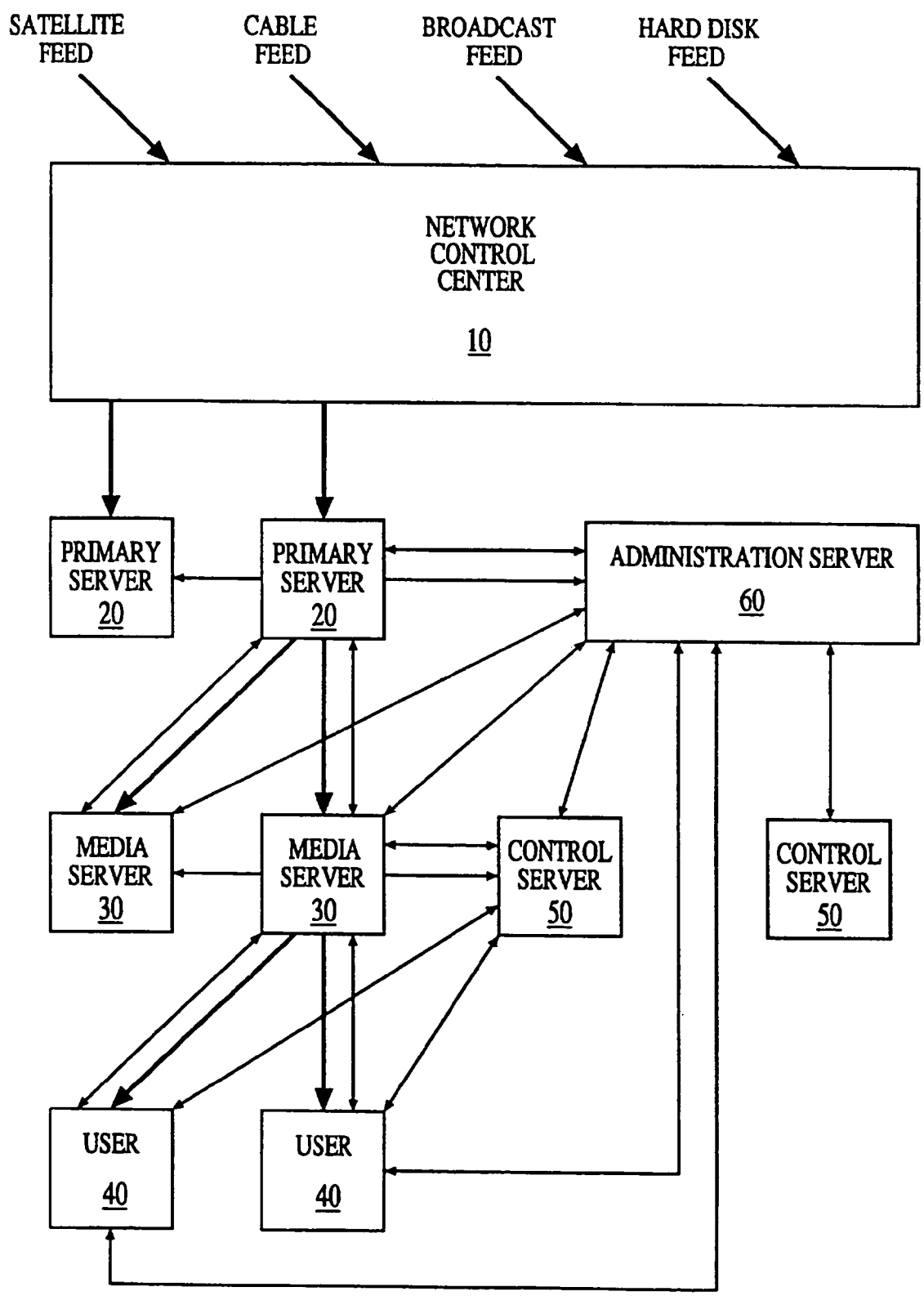
FIG. 1 is a schematic diagram depicting an overview of the system of the present invention.

Referring to FIG. 1, the system of the present invention comprises a Network Control Center 10, a plurality of Primary Servers 20, Media Servers 30, Users 40 and Control Servers 50 and an Administration Server 60. The servers are interconnected by a communications network, which in the preferred embodiment is the global connected internetwork known as the Internet. The Network Control Center 10 is the source of the information being distributed. It receives audio feeds from satellite, over the air broadcast or in other ways and processes this information for delivery over the network on multiple channels of information. This processing consists of optionally recording the information for future broadcast and dynamically inserting paid commercial advertisements.

For each channel of information, there is a Primary Server 20 that receives the stream of information from the Network Control Center 10 and compresses the information stream to allow for more efficient transmission. The Primary Servers 20 are directly connected to the network.

The Primary Servers forward information via the network to a number of Media Servers 30. There may be a large number of Media Servers and in fact there may be many levels of Media Servers. For example, a Media Server that receives a stream of information from a Primary Server may forward that stream via the network to another Media Server that then forwards it to a User 40. This multilevel hierarchical structure is described in more detail below.

The topology of the Internet dictates the ideal placement of Media Servers, the fan-out of each Media Server and the number of levels of Media Servers between the Primary Server and Users. For example, the Media Servers that feed from a Primary Server might be placed at major points of presence (POPs) of each of the large Internet service providers. These Media Servers might also be placed near clouds that serve as high bandwidth exchange points between the major carriers. Similarly, Media Servers that feed to Users might be placed on or close to networks that have a large number of subscribers to minimize the distance and number of data streams being transmitted.

Control Servers 50 are responsible for keeping track of which Users are listening to which channels and for directing the Media Servers to start and stop streams of information to those Users. The Control Servers are also responsible for handling other interactions among the various components of the system as will be described in more detail below. Each Control Server is responsible for managing a cluster of Media Servers; and each Media Server is managed by a single Control Server at any given time. As a result, the Control Servers are distributed throughout the Internet, preferably located close to the Media Servers.

The Administration Server 60 is responsible for registering new Users, authenticating Users who want to log onto the system, and maintaining audit logs for how many Users are listening to which channels and at which times. Maintaining audit logs and gathering statistics are features critical to monitoring the delivery of paid commercial messages as well as for other purposes. For example, for purposes of assessing copyright royalties, the audit logs can record the number of listeners for each musical or video selection that is distributed by the system. Another application is to determine the percentage of listeners who are interested in listening to a particular musical selection by determining how many listen to the entire selection and how many turn it off.

The system of the present invention can be considered a distribution architecture integrated with a control architecture. The distribution architecture handles scalable real-time delivery of information to any number of Users on a packet switched network, such as the Internet. The control architecture represents a second scalable system integrated with the distribution architecture for managing and administering the delivery of that information.

The remainder of this description is divided into three sections. In the next section the distribution architecture will be described in more detail. Following that, the control architecture will be described. In the third section the User interface will be illustrated.

I. Distribution Architecture

The distribution architecture provides for the delivery of real-time information to any number of Users distributed throughout a network. As will be described in detail below, the distribution architecture is scalable to allow for efficient delivery of multiple simultaneous information channels in real-time to a large number of Users.

In the preferred embodiment, the information that is being distributed consists of high-quality audio in addition to other information. It should be appreciated that the basic architecture and other general principles set forth herein would also apply to the delivery of video, graphics, text or any other type of information that can be delivered over a digital network. In addition, it should be appreciated that an information stream can consist of audio with supplemental information such as text and graphic images and commands to control software running on the User's computer.

Figure 2:
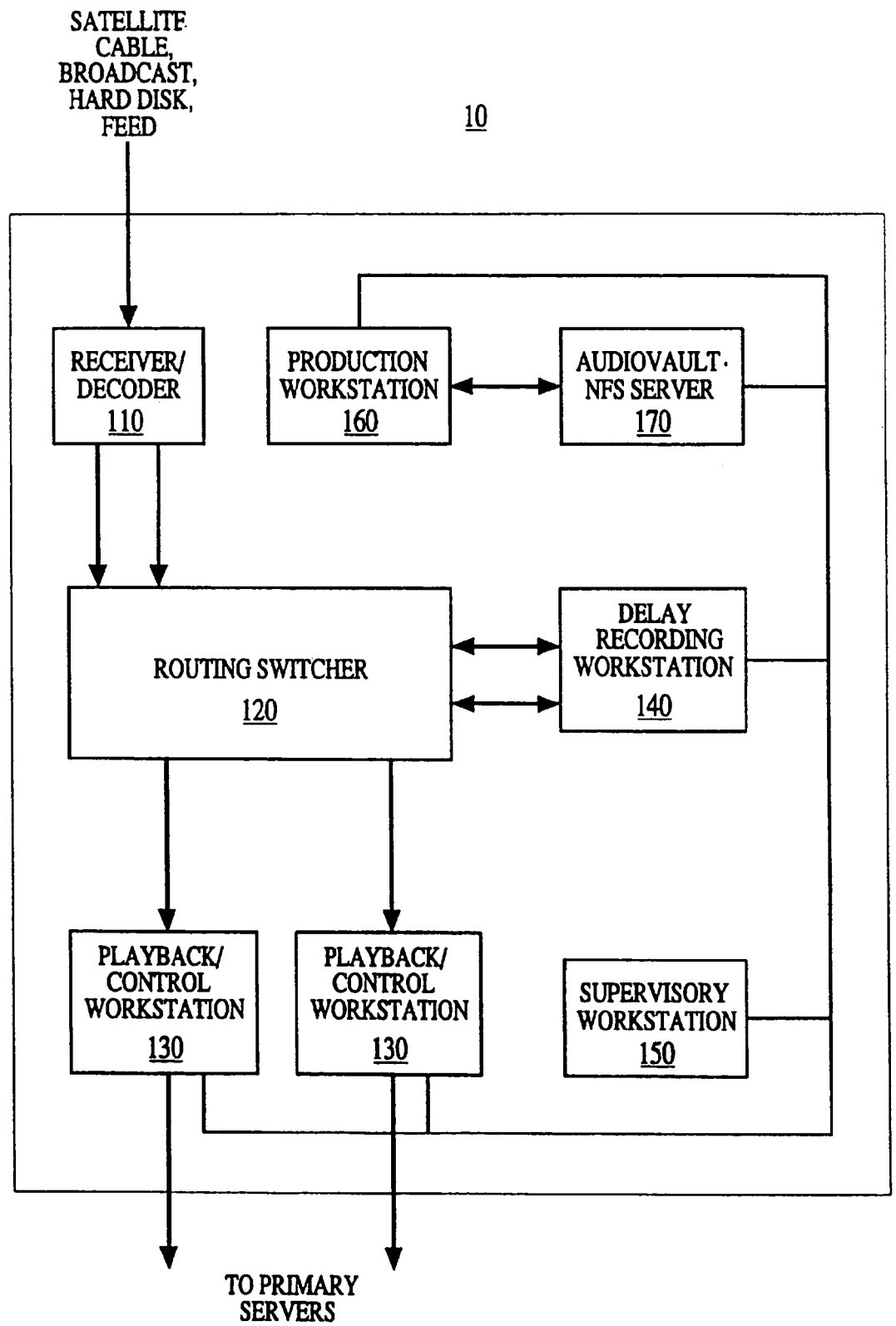
FIG. 2 is a schematic diagram depicting the network control center for the system of FIG. 1.

The source of information in the preferred embodiment is the Network Control Center 10, depicted in the schematic diagram of FIG. 2. Control Centers of this type of design are available from Broadcast Electronics, Inc. and are similar to what would be found in a conventional radio station serving multiple frequencies.

Referring to FIG. 2, the incoming signal can be received in a variety of ways such as from a satellite, over-the-air broadcast, cable or hard disk. It is then processed by Receiver/Decoder 110, which decodes the signal and provides an incoming audio stream. Routing Switcher 120 is responsible for routing the incoming audio feed from the Receiver to either Delay Recording Workstation 140 or to one of the Playback/Control Workstations 130. Real-time insertion of paid commercial advertising takes place at the Playback/Control Workstations and the resulting integrated audio stream is delivered to the Primary Servers. The Delay Recording Workstation is responsible for recording an incoming broadcast so that it can be played back at a later time.

Supervisory Workstation 150 is responsible for managing and controlling the Playback/Control Workstations, Delay Recording Workstations and other computers as may be connected to the local area network within the Network Control Center. Production Workstation 160 and Audio-VAULT-NFS Server 170 are used to manipulate audio samples, such as commercial messages for use by the Playback/Control Workstations. The audio being delivered can consist of syndicated TV or radio programs, such as would be received over satellite or cable and delivered as described above. These can be delivered live and/or played back at a later time. It is also possible for the delivery of information, such as music, to take place from information that is all stored locally such as on a hard disk. A new play list and its associated music data can then be downloaded periodically to update the channel. Additionally, it is possible to deliver commercial-free programming, for example public service announcements or label-specific music.

In the preferred embodiment the Primary Servers are responsible for compressing the audio stream using an advanced perceptual technique developed and licensed by AT&T Corp. and Lucent Technologies, Inc. This highly sophisticated algorithm is used to maximize the benefit of the bandwidth available. Advantageously, two bitrates are available, a first rate of approximately 20 Kbps and a second rate of approximately 56 Kbps. Using the perceptual technique, the quality of the first rate is similar to FM monaural (with a sampling rate of approximately 22,000 16-bit samples per second) and the second rate is close to CD quality stereo (with a sampling rate of approximately 32,000 16-bit samples in stereo each second). The signals at the two different bitrates comprise two different audio channels and thus require two different compression processes.

The computational requirements of compressing an audio stream in real time using techniques such as the advanced perceptual technique are approximately 100% of a Pentium-Pro 200 Mhz computer and the computational requirements of decompressing an audio stream in real time are approximately 30% of a Pentium 75 Mhz computer. Future improvements and/or changes to the algorithm could significantly change these requirements. For the present, a dedicated computer is required within the Primary Server to compress the audio stream. The decompression process takes place on end Users' computers and preferably would use only a portion of the computers' computational requirements, allowing the computers to be used for other tasks while they are processing the audio stream.

It is important to appreciate that the compression and decompression techniques employed by the present invention are not critical to the overall operation of the system and the advantages obtained therefrom could be obtained with other compression methodologies. Advantageously, the identity of the compression technique used can be encoded into the audio stream in the packet header. This makes it possible to identify to the receiver the nature of the decompression algorithm to use; and thereby make it possible for the computer within the Primary Server to select an optimum compression algorithm depending on the nature of the audio stream to be compressed.

Figure 3:
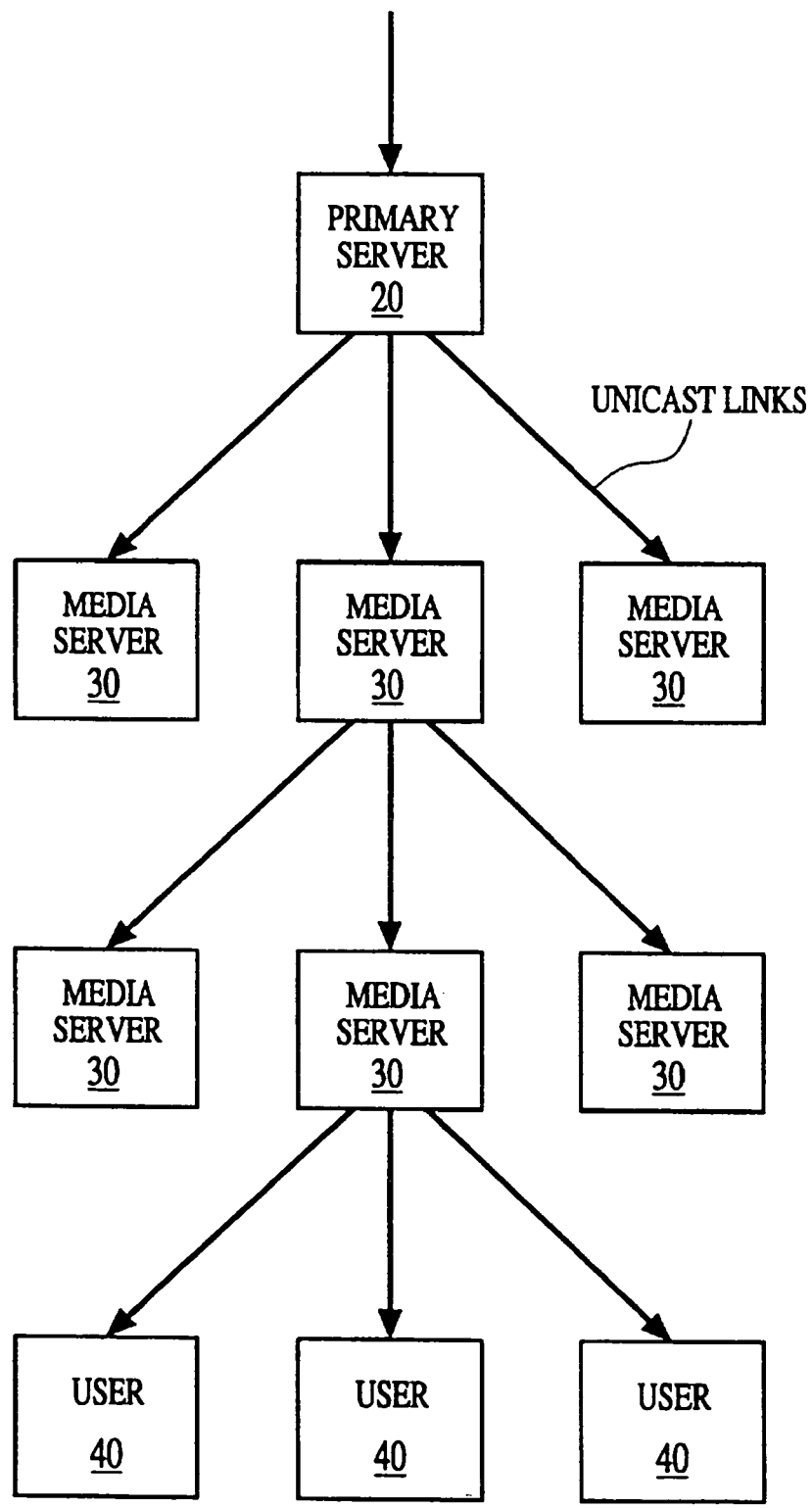
FIG. 3 is a schematic diagram depicting a unicast distribution structure.

The remainder of the distribution architecture comprises the multilevel hierarchy of data transmission originating at the Primary Server 20 and terminating at the Users 40 as shown in FIG. 3. In the preferred embodiment, the network is the global connected Internet. It can also include private networks that are connected to the Internet and it could be implemented on any packet switched network, cable-modem-based or satellite-based cable system. It is possible that certain links within the overall system, for example, the link between the Primary Server and the first level of Media Servers, are private data links that carry only data associated with this system. This could also be true of other data transmission paths in the distribution architecture. The User receiving the information preferably can be anyone who has access to the Internet with sufficient bandwidth to receive the resulting audio data.

It should be appreciated that the distribution architecture of the present invention provides for scalability. Using such a structure, any number of Users, and as widely distributed as necessary, can be accommodated. In the preferred embodiment, the fan-out at each level of Media Server (given the state of technology today) is on the order of ten, but the same structure could be applied with other fan-outs. The location and fan-out of the Media Servers is chosen to minimize overall network bandwidth consumed.

The flow of information from Primary Server 20 through network to User 40 is based on the delivery of a continuous sequence of individual pieces of information, or packets. Thus the distribution architecture implements a form of multicast packet delivery to a group. The group in this case is the set of all Users who are listening to a given channel at a given time. Group membership is dynamic; Users can start and stop listening to a channel at any time.

Multicasting can be implemented in a variety of ways, any or all of which can be used in the present invention. In the preferred embodiment, the Media Servers receive unicast packet streams and they then duplicate these streams into more unicast streams to other Media Servers that are in the membership group for that stream. The lowest level Media Servers use hardware broadcast, multicast and/or unicast to reach all Users served by that Media Server.

If the Media Server is directly connected to the same physical network as the User, hardware broadcast or multicast can be used to transmit the packet stream to all Users listening at that time on that network. In this case the Media Servers can translate the incoming packets into broadcast or multicast packets for transmission on the local network. Only a single packet is transmitted at-a-time on the local network and any computer directly connected to the local network can receive that packet. Hardware multicast is built into most networks and it is lower in overall overhead than hardware broadcast since computers not interested in a transmission do not have to process the packets. In the case that a Media Server is serving a User who is not on the same physical network, a unicast transmission is used to reach that User, which requires a separate packet transmission for each User so connected. In the preferred embodiment, the assignment of Users to Media Servers is done using control transactions among the User 40, Control Servers 50, and Administration Server 60. This system will be described more fully in the following section.

Figure 4:
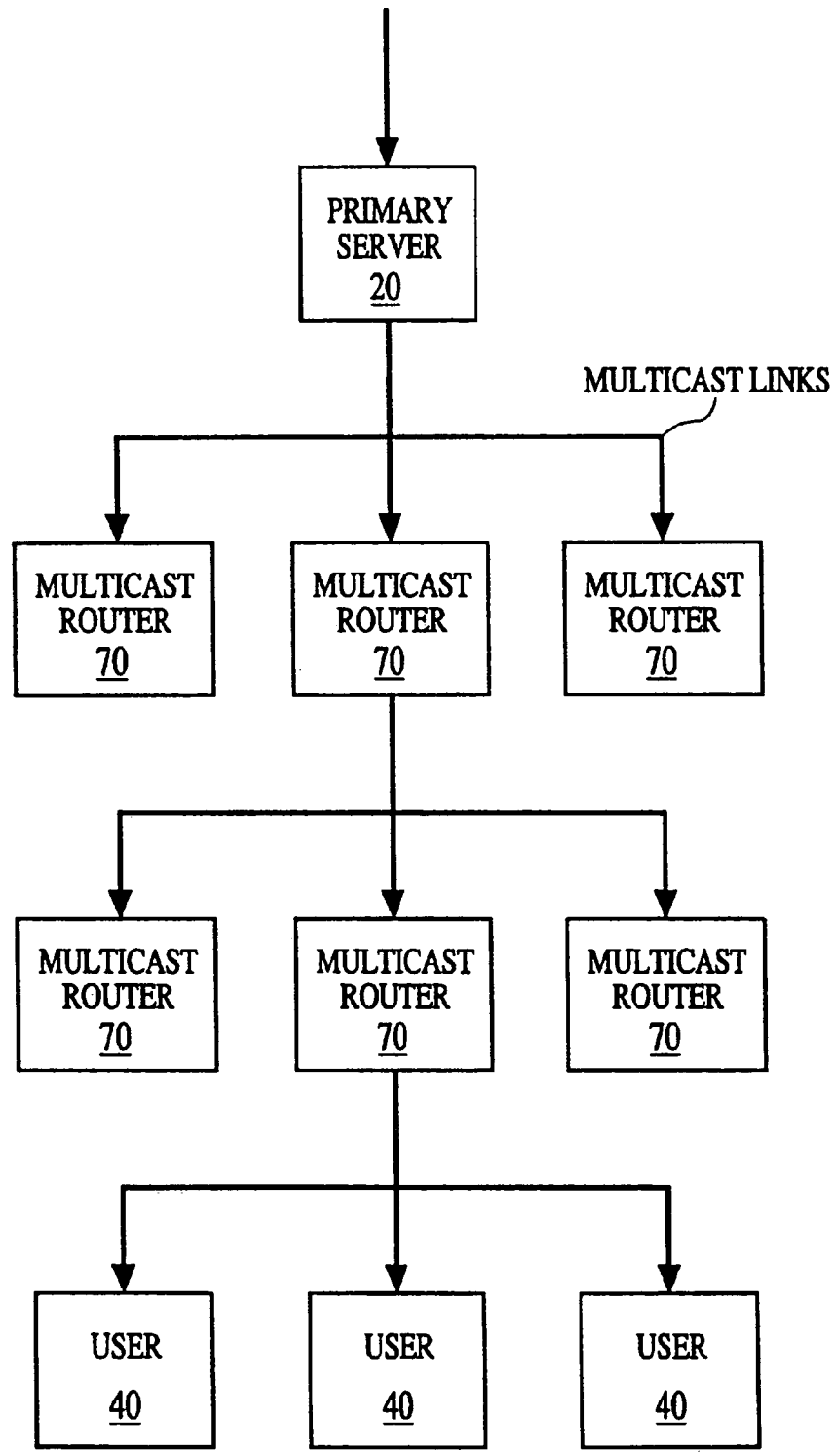
FIG. 4 is a schematic diagram depicting a multicast distribution structure.

Multicasting can also be implemented within the Internet at the IP level using IP class D addresses and the IGMP group control protocol. FIG. 4 illustrates how the multilevel hierarchical distribution architecture would operate using IP multicast delivery. Under this system, a packet is transmitted with a multicast address for a destination and each router maintains group membership lists for each interface that it is connected to and will forward packets across the Internet to other routers such that all Users within the global group eventually receive a copy of the packet. Unless and until all routers within the Internet understand multicasting in this way, it is necessary to supplement it with IP tunneling in which multicast packets are encapsulated in unicast packets and routed by unicast routers to multicast routers. The present invention can and will be able to take advantage of IP multicasting as it becomes widely available. Each channel of information would be given its own class D address and the Media Server would then simply transmit packets using the appropriate IP destination address. In this case no Media Servers would be used as this function would be accomplished by the routers in use to store and forward other IP packets.

Thus it can be appreciated that the implementation of the multicast delivery structure can be implemented using a combination of IP unicast, IP multicast and hardware multicast or any other system that provides for distributed delivery of information to a specific group of destinations. It is expected that special relationships with Internet providers will be established so that delivery of the audio steams can take place with a guaranteed bandwidth and in the most efficient way possible.

In the preferred embodiment, packets of information for distribution use the UDP protocol under IP rather than the TCP protocol. TCP provides for reliable stream delivery but at the cost of retransmission and delays. For real-time information, it is usually more appropriate to use UDP since the information is time critical and low latency is more important that reliability. Since TCP is a point-to-point protocol, it is incompatible with IP multicasting. However, TCP could be used on the IP unicast links between Media Servers that are expected to have very low packet loss. In order to handle out of order, lost, duplicate and corrupted packets, the UDP packets are serialized.

In the preferred embodiment the size of the audio packets being transmitted is variable and can change on a packet by packet basis. It is expected that when using compression schemes that have a fixed bit rate, such as ADPCM, all packets for that stream would be the same size. Alternatively when using a variable bit rate compression algorithm, it is expected that packet size would vary so as to establish approximately the same amount of time for each sample. For example, if each packet corresponds to a 20 millisecond segment of speech, this could correspond to 100 bytes during one time period and 200 bytes during another. Additionally, the Media Server may choose to dynamically vary the packet size to accommodate changes in network conditions.

Since the resulting playback of audio information is sensitive to packet loss and network congestion, software running on the various computers that make up this system monitors the ongoing situation and adapt to it in the best possible way. This may involve using different Media Servers and/or lowering the data rate to the User. For example, similar to analog dynamic signal quality negotiation present in many analog radio receivers, the User software may request a lower bitrate until the situation is improved. Also, note that the audio information being delivered to the User is preferably interleaved so that a contiguous segment of the audio stream is distributed for transmission over several packets. As a result, the loss of one packet is spread out over multiple audio samples and causes minimal degradation in audio. Advantageously, a small degree of redundancy may be incorporated within the audio stream to further guard against packet loss.

Preferably, there are two bitrate options available to the User for audio delivery. These are approximately 20 Kbps for standard audio and approximately 56 Kbps for high quality audio. Thus, a 28.8 Kbps modem connection over an analog phone line is sufficient to listen to standard audio broadcasts. To listen to high quality audio, an ISDN connection to the Internet is required, or some other connection with greater than 56 Kbps bandwidth. It should be appreciated that higher bandwidths are currently becoming available to end Users. In particular the use of cable modems and residential fiber networks are enhancing the bandwidths available to Users and thus making broadcasts of higher bitrates more practical. In addition to the content of the audio channel being delivered, it is also possible to deliver out of band of side-bar information such as graphics, images and text.

This side-bar information is synchronized with the audio channel. This may only involve small increases in bandwidth requirements, such as 1–2 Kbps. For example a music program could deliver images of an album cover, the text of song lyrics, or URLs for use by a Web browser. The User can preferably choose to have the side-bar information show up automatically or be hidden. It is also possible to incorporate two-way interaction into the system, such that for example Users can participate in a global chat session during the audio broadcast. These and other details are explained in more detail below under the description of the User interface.

The delivery of paid commercial advertising information is an important aspect of the present invention. Advertising may be incorporated into the audio stream within the Network Control Center as described above. It may also be incorporated into the audio stream at the User level, or at some intermediate point in the distribution architecture.

Figure 5:
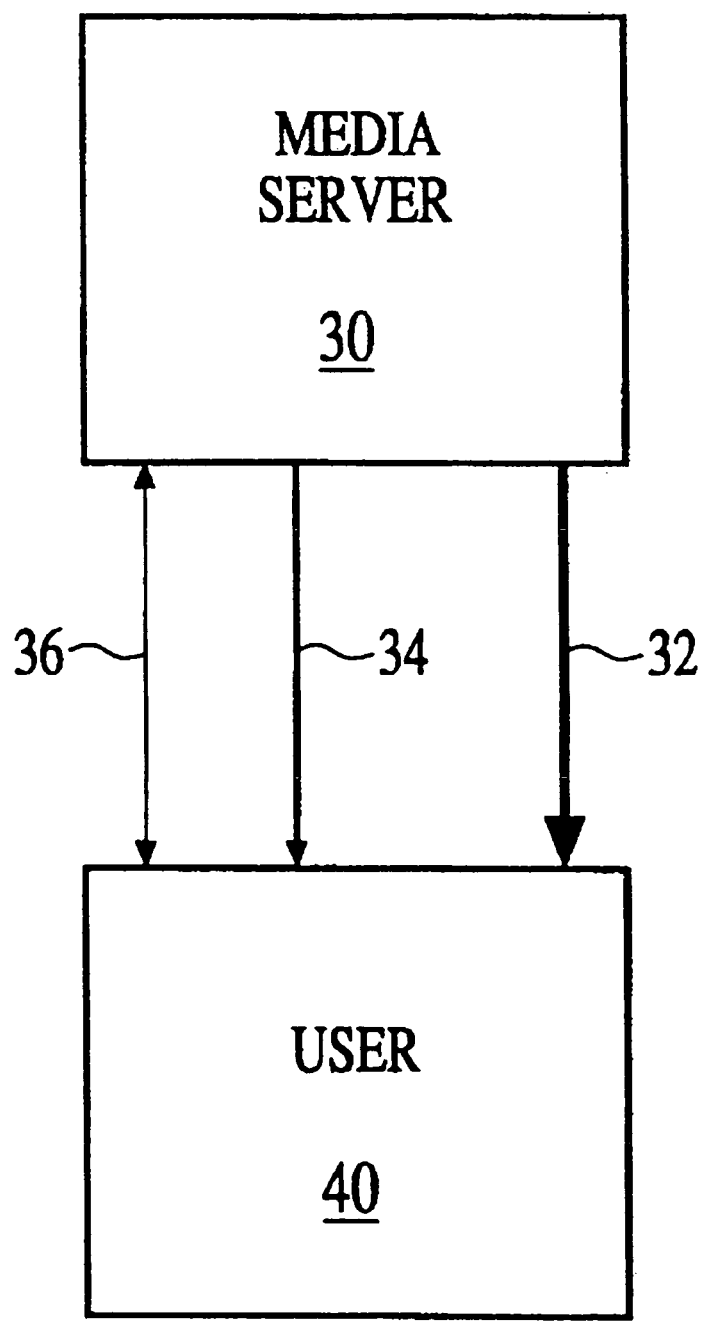
FIG. 5 is a schematic diagram depicting the connection between the media server and the user in the system of FIG. 1.

In addition, the side-bar information discussed above can also include advertising content. FIG. 5 illustrates the provision to the User of two separate streams 32, 34 of packets, one of which may be used for advertising. In this case the insertion of the stream of commercial advertising into the non-commercial stream occurs on the User's computer. FIG. 5 also illustrates packet stream 36, which identifies the User to the system. This enables the system to monitor which Users are listening to which channels and also allows the system to vary, for example, the advertising content delivered to a User.

One advantage of this alternative is to allow targeted commercial delivery based on the individual User. That is, an individual User would receive the main audio feed plus a particular advertising stream unique to his demographic group. Note that the advertising stream typically is lower in overall bitrate and generally does not require real-time delivery, thus lowering the overall load on the network. For example, the advertising stream could be delivered to the User in advance of the regular programming, stored in a buffer in the User's computer and inserted into the stream of regular programming upon receipt of a cueing signal embedded in the stream of regular programming. Thus, a substantial number of targeted groups, perhaps 10 or 100 or even more could be accommodated without an impractical increase in network load.

II. Control Architecture

The control architecture described in this section is responsible for managing and administering the Users who are receiving the information being delivered by the distribution architecture described in the previous section. The control architecture handles new User registration, User login, the starting and stopping of audio streams and the monitoring of ongoing transmissions. The control architecture is scalable just as is the distribution architecture so that any number of Users can be managed.

This section describes the control protocol, which consists of the format and sequence of control messages that are exchanged among Users, Control Servers, Media Servers, Primary Servers and the Administration Server. These messages are in the form of objects that have specific data formats. Objects are exchanged preferably using the TCP protocol although other options are possible. Below we describe the sequence of objects passed among the various computers and detail the internal structure of each object.

The major objects used in the present embodiment of the invention are set forth in Table 1. For each object, Table 1 provides a brief description of its function, identification of the names of the fields in the object, their types and a brief description of their function.

TABLE 1

Channel Activation Object
Contains information used for channel activation/deactivation.
It is sent to Media and Primary Servers to tell them to carry or
stop carrying a specific channel. Media Servers get the channel
from another server in the system hierarchy and Primary
Servers get and encode the feed from the actual input source.

| Field Name | Field Type | Remarks |
|---|---|---|
| Token | Security Token Object | |
| Moniker | Moniker Object | unique channel identifier |
| Activate | Int | action flag (activate/deactivate) |
| CompressType | Int | type of compression to use |
| Host | Host Object | host carrying the channel |

Channel Guide Object
Contains analytical and descriptive information for an item
requested that is uniquely identified by a moniker. It is
usually the reply to a Channel Guide Request object.

| Token | Security Token Object | |
|---|---|---|
| Type | Int | type of content |
| Result | | the content data itself |

Channel Guide Request Object
Conveys a request for analytical and descriptive information
about an item uniquely identified by the contained moniker.
The reply is in the form of a Channel Guide object.

| Token | Security Token Object | inherited from base class |
|---|---|---|
| Type | Int | type of content |
| Moniker | Moniker Object | unique identifier |

Host Object
Encapsulates the attributes of a networked computer related
to the operation or services it offers or requests.

| Token | Security Token Object | |
|---|---|---|
| HostName | String | computer name and domain |
| PortNumber | Int | port number for service |
| DisplayName | String | descriptive computer name |

Login Information Object
Encapsulates the name and password by which a User is
known to the system.

| Token | Security Token Object | |
|---|---|---|
| Login | String | User's system login name |
| Password | String | User's system password (possibly encrypted) |

Media Control Interface (MCI) Request Object
Encapsulates a multimedia control command, such as play
and stop, and any extra information that may be necessary
to perform the requested service.

| Token | Security Token Object | |
|---|---|---|
| Command | Int | multimedia command |
| String | String | command-specific extra info |

Moniker Object
A moniker encapsulates the name of an object or process
with the intelligence necessary to work with that name.
In other words, it provides naming and binding services.
The Moniker Object is used in the system for unique
identification of various components, parts or features,
such as a channel, a directory, or a computer list.

| Token | Security Token Object | |
|---|---|---|
| ID | String | unique string identifier |
| DisplayName | String | User-readable name |

TABLE 1-continued

Ping Object
Ping is the name given to the "Are-You-Alive?"
operation useful in determining if a specific computer is up
and running. This object is used in the system when a server
has to be queried for its operational status. It can also
provide timing information for statistical purposes and
quality of service evaluations.

| Token | Security Token Object | |
|---|---|---|
| Date | Date | system date |
| Time | Time | system time |

Protocol List Object
Encapsulates a general purpose collection object.

| Token | Security Token Object | |
|---|---|---|
| Type | Int | type of object list |

Result Message Object
Acts as the acknowledgment for a requested service
successfully carried that out or reports errors that occur
in the system during a client/server transaction.

| Token | Security Token Object | |
|---|---|---|
| Code | Int | result code |
| Message | String | message corresponding to code |

Security Token Object
Contains the authorization key for a transaction.
The key must be validated before any service is performed.

| ID | String | authorization key/transaction ID. |
|---|---|---|

Server Activation Object
Contains information used in the server activation/
deactivation process. Used for announcement as well
as command purposes (e.g., a server can notify the
administration database that is now activated or a
server can be instructed to manage someone else).

| Token | Security Token Object | |
|---|---|---|
| Active | Int | action flag (activate/deactivate) |
| Manage | Int | control flag (manage/associate) |
| Type | Int | server type |
| Host | Host Object | host to be controlled |

Server List Request Object
Encapsulates a request for a list of available server
resources for an identified service (e.g., a request
for a list of Control Servers for a specified channel).

| Token | Security Token Object | |
|---|---|---|
| Type | Int | type of service |
| Moniker | Moniker Object | content/channel unique identifier |
| Host | Host Object | local host information |

Statistics Object
Contains system-related information that can be used
by load-balancing algorithms and for statistical purposes.

| Token | Security Token Object | |
|---|---|---|
| Load | Int | load on the system |
| Threads | Int | number of threads running |
| Users | Int | number of Users being serviced |
| Uptime | Int | amount of time running |
| NumberManaged | Int | number of managed servers |
| NumberAssociated | Int | number of associated servers |

Statistics Request Object
Encapsulates a request for system-related information
that can be used by load-balancing algorithms and
statistical purposes.

| Token | Security Token Object | |
|---|---|---|
| Load | Int | request flag (on/off) |
| Threads | Int | request flag (on/off) |
| Users | Int | request flag (on/off) |
| Uptime | Int | request flag (on/off) |

TABLE 1-continued

| | | |
|---|---|---|
| NumberManaged | Int | request flag (on/off) |
| NumberAssociated | Int | request flag (on/off) |

User Object
Users and Servers use this object to register themselves with the administration database. They provide the information for subsequent logins (name, password) and other system-related info. The end-Users provide personal, demographic, and system-related information.

| | | |
|---|---|---|
| Token | Security Token Object | |
| Login | Login Information Object | login information(name, password) |
| FirstName | String | User's first name |
| LastName | String | User's last name |
| Title | String | User's job title |
| Company | String | User's employer |
| Address1 | String | User's home street address |
| Address2 | String | User's address extra |
| City | String | city, village |
| State | String | state, province or foreign country |
| ZipCode | String | zip or postal code |
| Age | String | User's age |
| Gender | String | User's gender |
| PhoneNumber | String | telephone number |
| FaxNumber | String | fax number |
| Email | String | email address |
| Demographics | Dictionary | market-targeting extra User info |
| SystemInfo | Dictionary | system-related information |

Version Object
All components of the system use this object to report their versioning information to the party they transact with in order to use a protocol they both understand. They are also given the chance to update themselves if a newer version exists.

| | | |
|---|---|---|
| Token | Security Token Object | |
| Major | Int | major protocol version number |
| Minor | Int | minor protocol version number |
| Type | Int | sender type |
| Client | Version | client version information |

Unlike traditional protocols based on state computers, the control protocol of the present invention is a light-weight, stateless protocol comprising simple sequences of objects. It is light-weight in that in most sequences only two objects are involved in the transaction and after a sequence is completed the connection can be reused. It is also stateless in that the server maintains no information about the client. Every transaction is handled independently of the previous ones. States exist in the lower levels, for example within the TCP layer, to express logical states of a network connection but they are not actually part of the control protocol.

In the preferred embodiment, the software running on the Control Servers, Media Servers and Primary Servers is programmed for Windows NT and UNIX environment using the OLE environment. In addition, COM interfaces are used between components. The Rogue Wave system is used to transfer objects between the applications running on the various computers. The software running on the User computer is preferably programmed for a Windows 32-bit environment, so it will run on a Windows 95 or Windows NT computer. Alternatively, Macintosh and UNIX environments can be accommodated by other User software.

The basic process of a control transaction consists of a version sequence followed by one or more protocol sequences. The version sequence starts after the computer initiating the transaction, the client, has established a connection with the computer completing the transaction, the server. The client sends a Version Object (defined in Table 1) and in response the server then sends back its own Version Object. This version sequence is used so that both client and server are aware of the version numbers of the software they are using. If a version number is older than expected, either client or server can choose to conform to the previous version or abort the transaction, depending on its needs and capabilities. If a version number is newer than expected, in most cases the current transaction can be completed since the software systems are designed to be fully backward compatible with previous versions. Additionally, in the case that the server of the transaction is the Administration Server, the client receives information about what the latest version number is and thus the client can be informed that a software update is needed. The process of handling automatic updating of User software is described more fully below.

After the version sequence, one or more protocol sequences occur in which other objects are exchanged between client and server. When a particular protocol sequence is completed, another independent protocol sequence can be serviced. The protocol sequences that are part of the control architecture of the present invention are summarized in Table 2 and described below in conjunction with FIGS. 6–17.

TABLE 2

Summary of Protocol Sequences

| Control Sequence | Client | Server | Main Objects Exchanged |
|---|---|---|---|
| User Registration and Login (see FIG. 6) | User | Administration | Version Object<br>User Object<br>Channel Guide Object |
| User Login (see FIG. 7) | User | Administration | Version Object<br>Login Information Object<br>Channel Guide Object |
| Channel Play (see FIGS 8a, 8B, 8C) | User | Administration | Version Object<br>Server List Object |
| | | Control | Version Object<br>Server List Object |
| | | Media | Version Object<br>MCI Objects - OPEN/ PLAY/ STOP/CLOSE<br>Ping Objects<br>(TCP connection stays open) |

TABLE 2-continued

Summary of Protocol Sequences

| Control Sequence | Client | Server | Main Objects Exchanged |
|---|---|---|---|
| Token Validation (see FIGS. 9A, 9B) | Control or Media or Primary | Administration or Control | Version Object<br>Security Token Object |
| Server Registration and Login (see FIG. 10) | Media or Control | Administration | Version Object<br>User Object<br>Server Activation Object |
| Server Login (see FIG. 11) | Media or Control | Administration | Version Object<br>Login Object<br>Server Activation Object |
| Control Server Activation (see FIG. 12) | Administration | Control | Version Object<br>Server Activation Object |
| Media Server Activation (see FIG. 13) | Control | Media | Version Object<br>Server Activation Object<br>Ping Objects<br>(TCP connection stays open) |
| Control Channel Activation (see FIG. 14) | Administration | Control | Version Object<br>Channel Activation Object |
| Media Channel Activation (see FIG. 15) | Control | Media | (open TCP connection)<br>Channel Activation Objects |
| Distribution Activation (see FIG. 16) | Media | Media or Primary | Version Object<br>MCI Objects - OPEN/ PLAY/ STOP/CLOSE<br>Ping Objects<br>(TCP connection stays open) |
| Statistics Request (see FIG. 17) | Administration | Control or Media | Version Object<br>Statistics Object |

The User registration and login sequences are the processes by which a new User registers with the system, logs in and retrieves programming information. The channel play sequence takes place when a User asks to listen to a particular channel. The token validation sequence is used to verify that a computer requesting a service is authorized to do so. The Server registration, login and activation sequences are used by Control and Media Servers when they become active. The Control Server and Media Server activation sequences are used to manage the Control and Media Servers. The control channel, media channel and distribution activation sequences are used to cause a channel to be distributed to a Media Server. Finally, the statistics request is used for administrative purposes.

Figure 6:
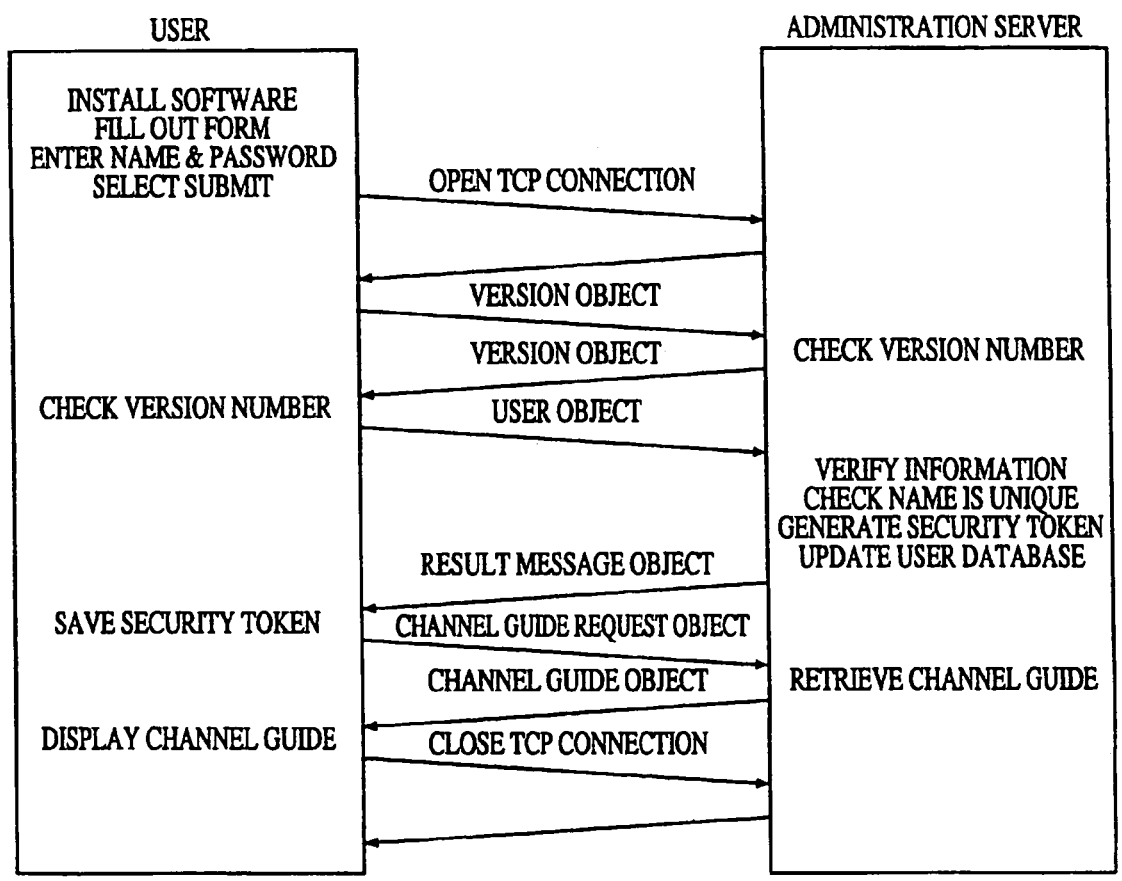
Figure 7:
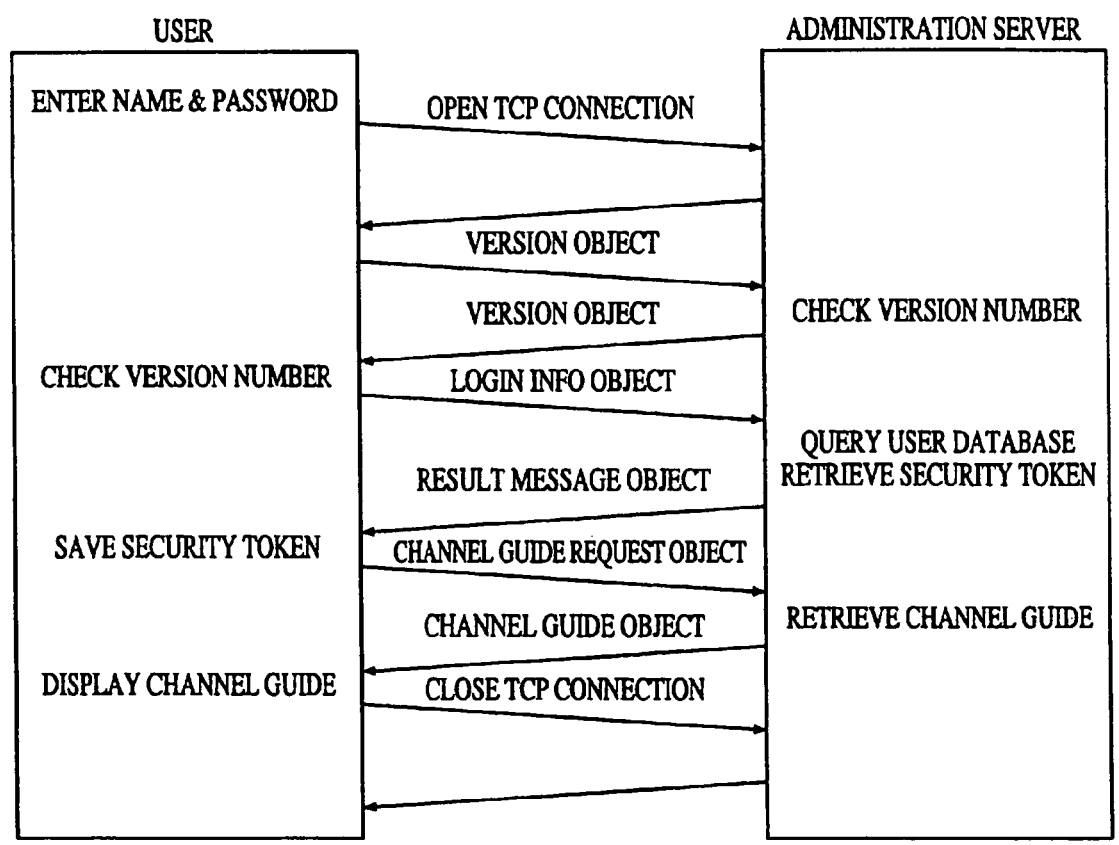

FIG. 6 illustrates the User registration and login sequence in more detail. This sequence takes place after the User has installed the User software on his/her computer. It is expected that the User will download the software from the Internet and then invoke it, which in the preferred embodiment will use the Windows Wizard interface. This will guide the User through the installation process including filling out the registration form, which we will describe more fully in the next section. After the User has selected a name and password and selected the option to register, the User computer opens a TCP connection to the Administration Server. Advantageously, the full domain name of the Administration Server is embedded into the User software, although it could be discovered in other ways. The User and Administration Server then exchange version objects with the Administration Server as described above. If the version numbers meet expectations, the User sends a User Object to the Administration Server. The format of the User Object is shown in Table 1. Once the Administration Server receives the User Object, it verifies that the information is filled in properly and that the selected User name is unique. If the User Object is invalid for any reason, the Administration Server returns a Result Message Object with a code indicating the reason. The format of the Result Message Object is shown in Table 1. If the User information is valid, the Administration Server updates the global database of User names and passwords and then generates a security token for that User. This security token is then returned to the User in a Result Message Object.

Upon receiving the Result Message Object, the User saves the security token for future use. This token is an identifier that allows the User to request services from the Administration Server and other computers within the overall system. The security token is not saved permanently or registered on the User computer. Normally, the User software then immediately sends a Channel Guide Request Object to the Administration Server and a Channel Guide Object is returned.

The format of these objects is also shown in Table 1. Note that in principle, this is a separate transaction and could take place in a separate TCP connection to the Administration Server. In particular, once the User has registered and logged in, he/she can request the Channel Guide Object again since it may have been updated since the previous request. At this point the TCP connection to the Administration server is closed.

The process of User registration only needs to take place once for each User. However anyone can re-register at any time, even after the software has been installed. In particular, it is expected that if multiple persons use a computer, each person will register and obtain his/her own User name and password. If the registration process is not completed successfully, the User software saves the registration information and asks the User if they would like to try again the next time the software is invoked.

Since the security token is not permanently saved by the User software, it is lost when the User software is closed, and the security token must again be retrieved from the Administration Server the next time the User wants to use the system. This process is the purpose of the login sequence illustrated in FIG. 7. This sequence is used if a User has already registered and needs only to retrieve a valid security token. In this case the sequence consists of the User's sending a Login Information Object to the Administration Server. The Administration Server then queries the User database to validate the login name and password. If the login name and password are correct, then a security token is returned to the User. Normally the receipt of the security token will immediately be followed by a channel information request sequence, just as in the registration sequence described previously.

Figure 8A:
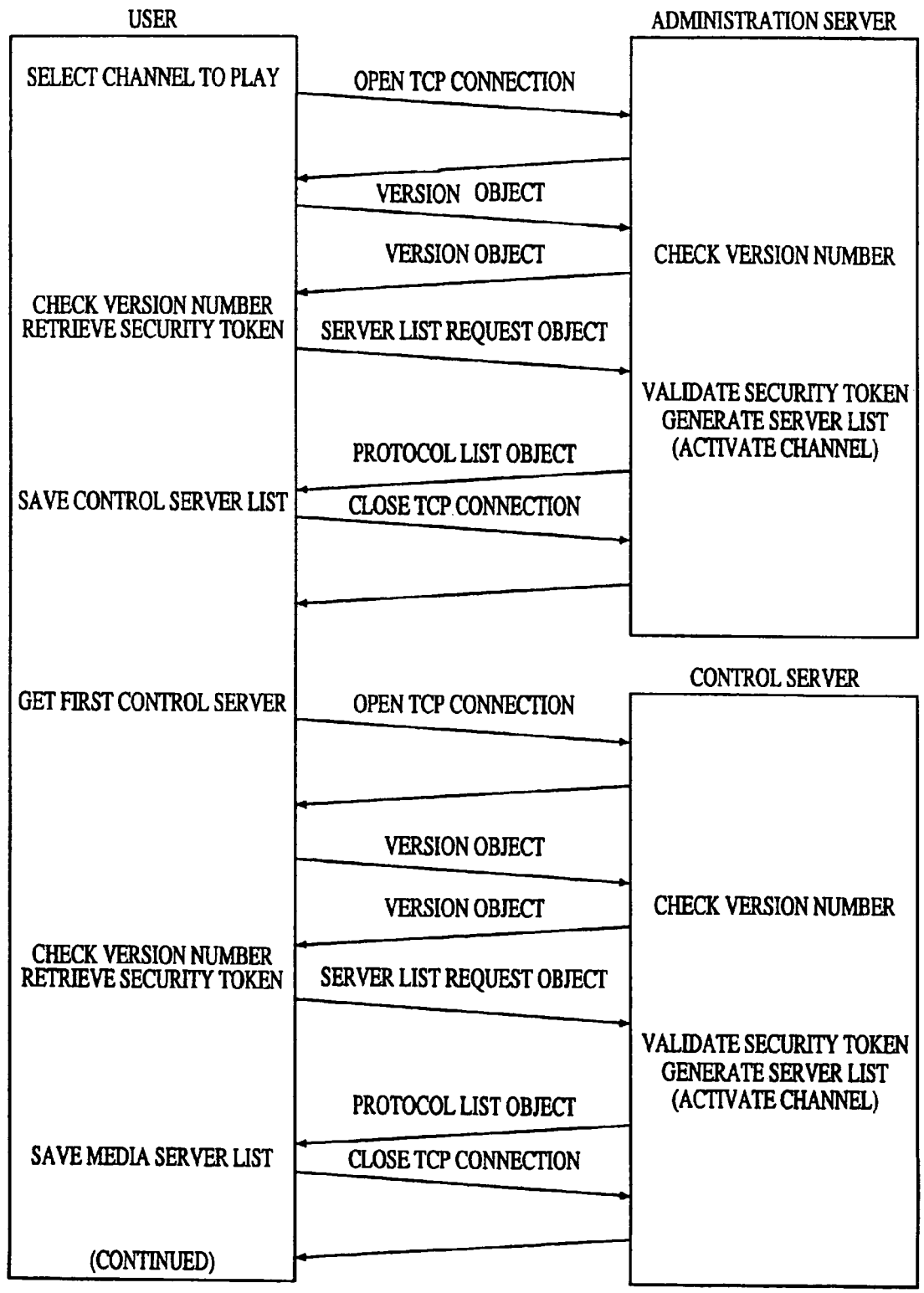
Figure 8B:
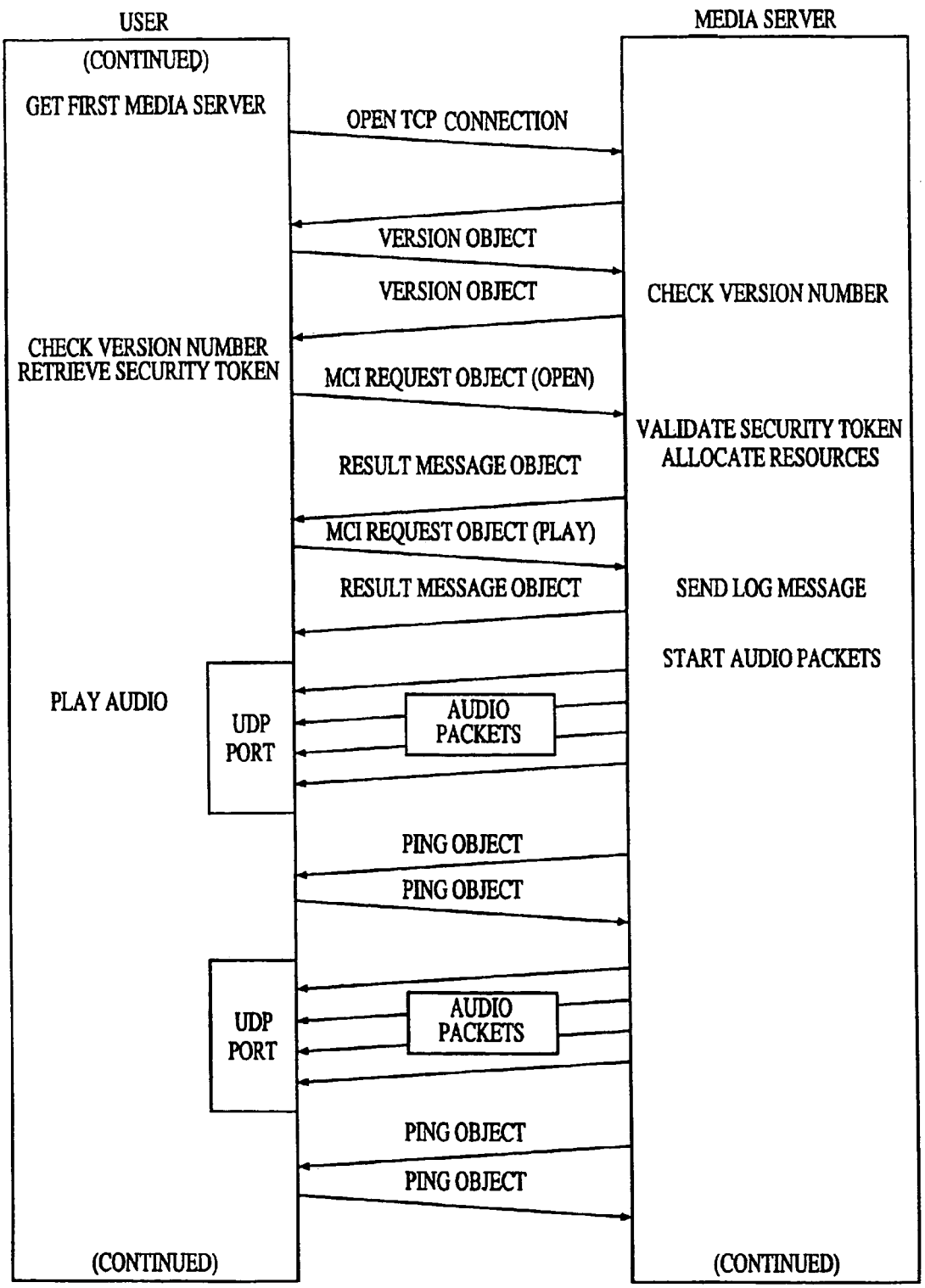
Figure 8C:
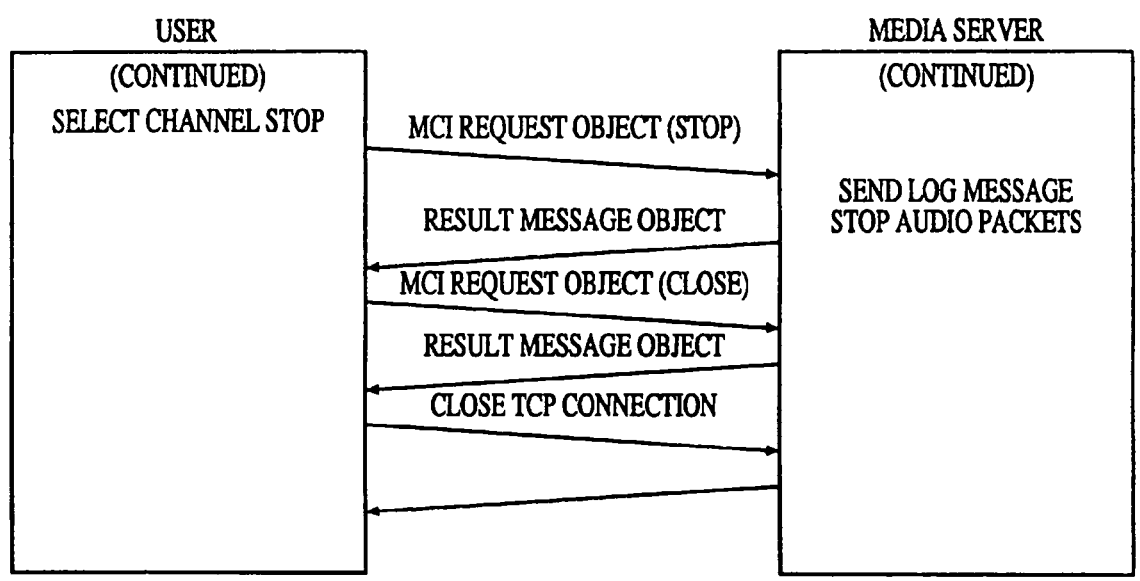

The control sequence that takes place when a User initiates a channel play operation is illustrated in FIGS. 8A, 8B and 8C. First the User software requests a Control Server List from the Administration Server. Note that the Server List Request Object, illustrated in Table 1 contains a channel identifier. The Administration Server generates a sorted list of Control Servers based on overall system load and the location of the User on the network and returns this list to the User using a Protocol List Object. Once the Control Server List is returned to the User, the Administration Server is no longer needed and the TCP connection is closed.

The User software then searches the list of Control Servers and opens a TCP connection to the first host listed. If that host computer does not respond, then the next Control Server on the list is tested and so forth in succession. Upon obtaining a response from a Control Server, the User software uses a Server List Request Object to request a Media Server List from the Control Server. If the Control Server is too busy to service the User, it returns a Result Message Object so indicating and the User software tries the next Control Server on the list. However, in the likely scenario that the Control Server is able to handle the User's request, a sorted list of Media Servers is generated and returned to the User computer using a Protocol List Object. The TCP connection to the Control Server is then closed by the User software.

At this point the User software initiates a TCP connection to the first Media Server on the list provided by the Control Server. As in the previous case, it attempts to connect to the first host on the list and if unsuccessful tries the next hosts in succession. Once the Version Objects are exchanged, the User software sends an MCI Request Object to the Media Server. An MCI Request Object can be used for four basic commands: OPEN, PLAY, STOP and CLOSE. The User software must first send an OPEN command for the desired channel. If the returned Result Message Object indicates success, the User software then sends a PLAY command.

When the Media Server receives a valid PLAY command, it initiates the delivery of audio information to the User as described in the previous section. Note that this could be in the form of broadcast, multicast or unicast packets to a specific UDP port. The TCP connection through which the MCI Request Objects were sent stays open during the audio play operation. In addition, Ping Objects are sent to the User on a periodic basis to verify that the computer is still working and active. When the User software receives a Ping Object, it simply returns it. The Media Server uses the Ping Objects to measure round trip time and also to determine when a User's computer has terminated abnormally. In that case the audio stream is terminated.

In the case of normal termination of the audio stream, the User makes an explicit selection to stop and this causes a STOP command to be sent to the Media Server in an MCI Request Object. The Media Server then terminates the audio stream to that User. When the User closes the application software or selects another channel to play, the User software will send a CLOSE command to the Media Server in an MCI Request Object and the TCP connection is closed.

The initiation of the audio stream by the Media Server causes a log entry to be generated and sent to the Administration Server. This information is important so that the Administration Server can update its database to indicate which Users are listening to which channels. The security token is used to identify the User initiating the audio stream. Additionally, when the audio stream is terminated to any User, another log message is generated and sent to the Administration Server.

Figure 9A:
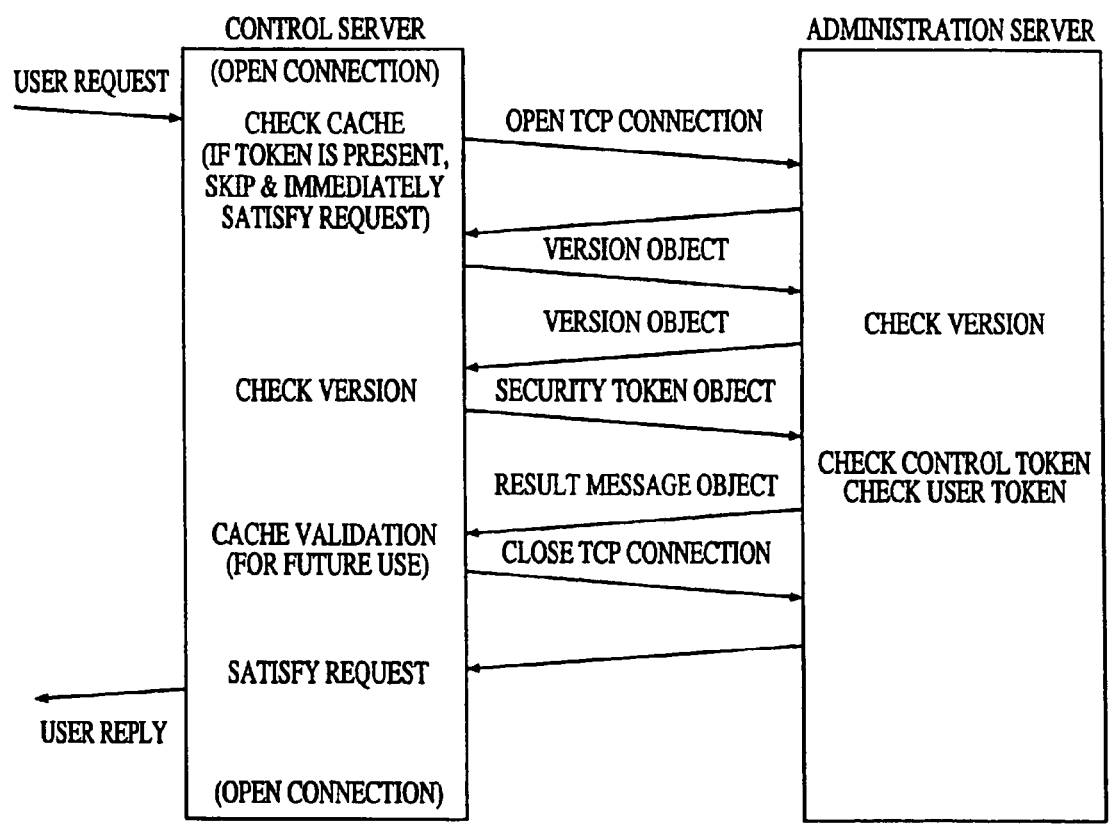

FIG. 9A illustrates the process by which security tokens are validated. The Administration Server is the only server that can validate a security token. Thus, when a User requests services from a Control Server or from a Media Server, that server must go back to the Administration Server with a token validation sequence. However, Control Servers and Media Servers are allowed to cache validations of security tokens so that they do not have to validate tokens repeatedly once they have validated it the first time. In the case where a Media Server receives a request, the token will be validated with the Control Server that is managing that Media Server. FIG. 9B identifies the various token validation scenarios.

Figure 10:
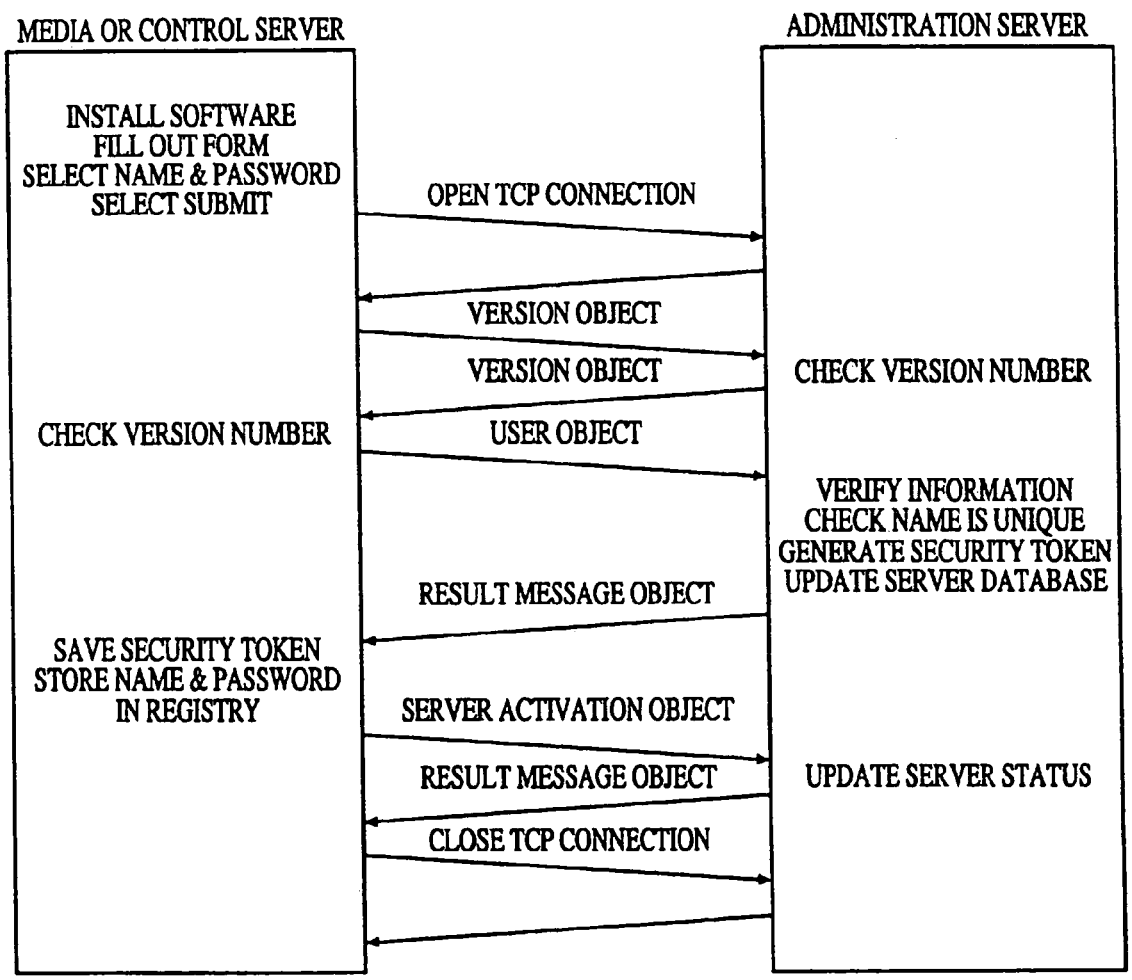
Figure 11:
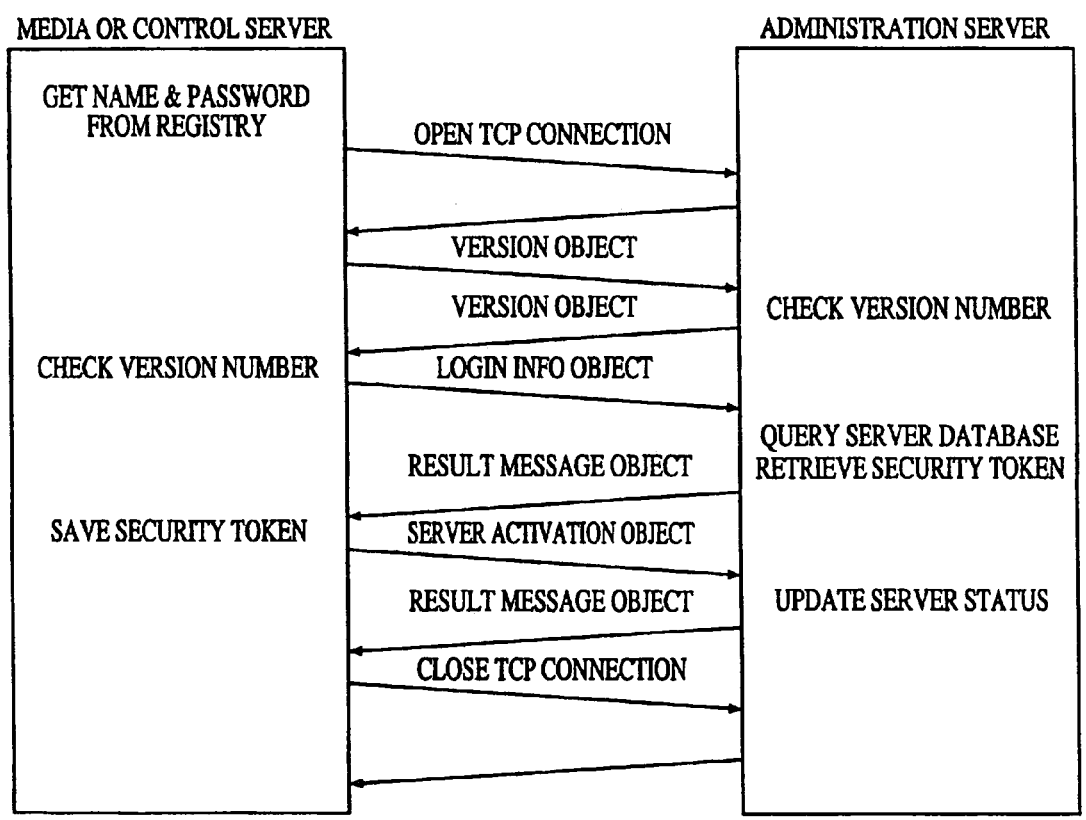

FIG. 10 illustrates the process by which a new Server is registered. This process is similar to new User registration. It is expected, however, that the server installation will be through a Web interface rather than a Wizard. The Administration Server, upon receiving a User Object from a Media Server or Control Server, validates the User name and password and generates a security token just as in the case of User registration. Normally the Server then immediately sends back a Server Activation Object indicating that it is ready to be used as a system resource. Once this process has been completed, the TCP connection to the Administration Server is closed.

If a Media Server or Control Server that has sent a Server Activation Object to the Administration Server becomes inactive, it will send another Server Activation Object indicating this condition. In the case of a Media Server, this object is sent to the managing Control Server. In the case of a Control Server, this object sent to the Administration Server. As in the case of User registration, Media Server and Control Server registration needs only take place once per computer. However, if the computer is restarted, the server must login and again retrieve a security token. This is the server login and activation sequence shown in FIG. 11.

Figure 12:
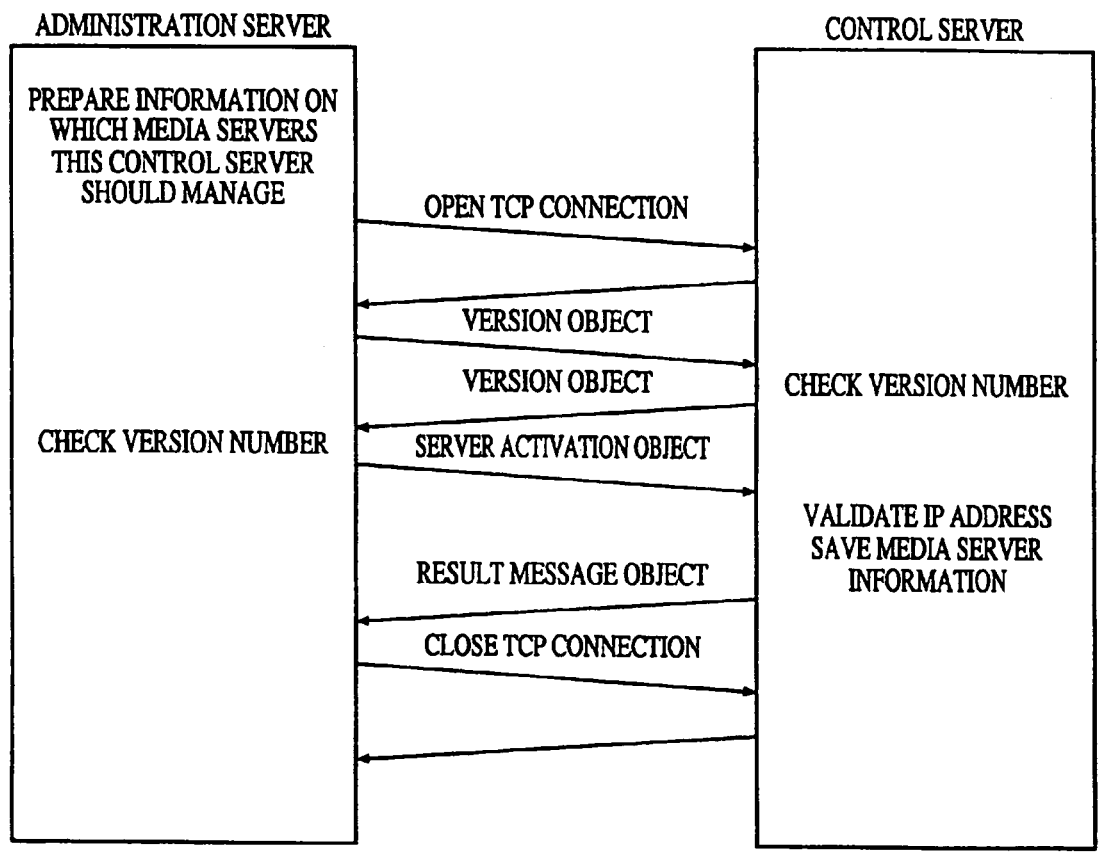

Once a Control Server has indicated to the Administration Server that it is ready, the Administration Server can activate that Control Server by sending the Control Server a Server Activation Object as illustrated in FIG. 12. This is a separate transaction and is used to tell the Control Server which Media Servers it is supposed to manage. Recall that a Control Server and a number of Media Servers form a cluster of Media Servers. The single Control Server that manages that cluster must be given a list of host computers corresponding to the Media Servers in that cluster.

Figure 13:
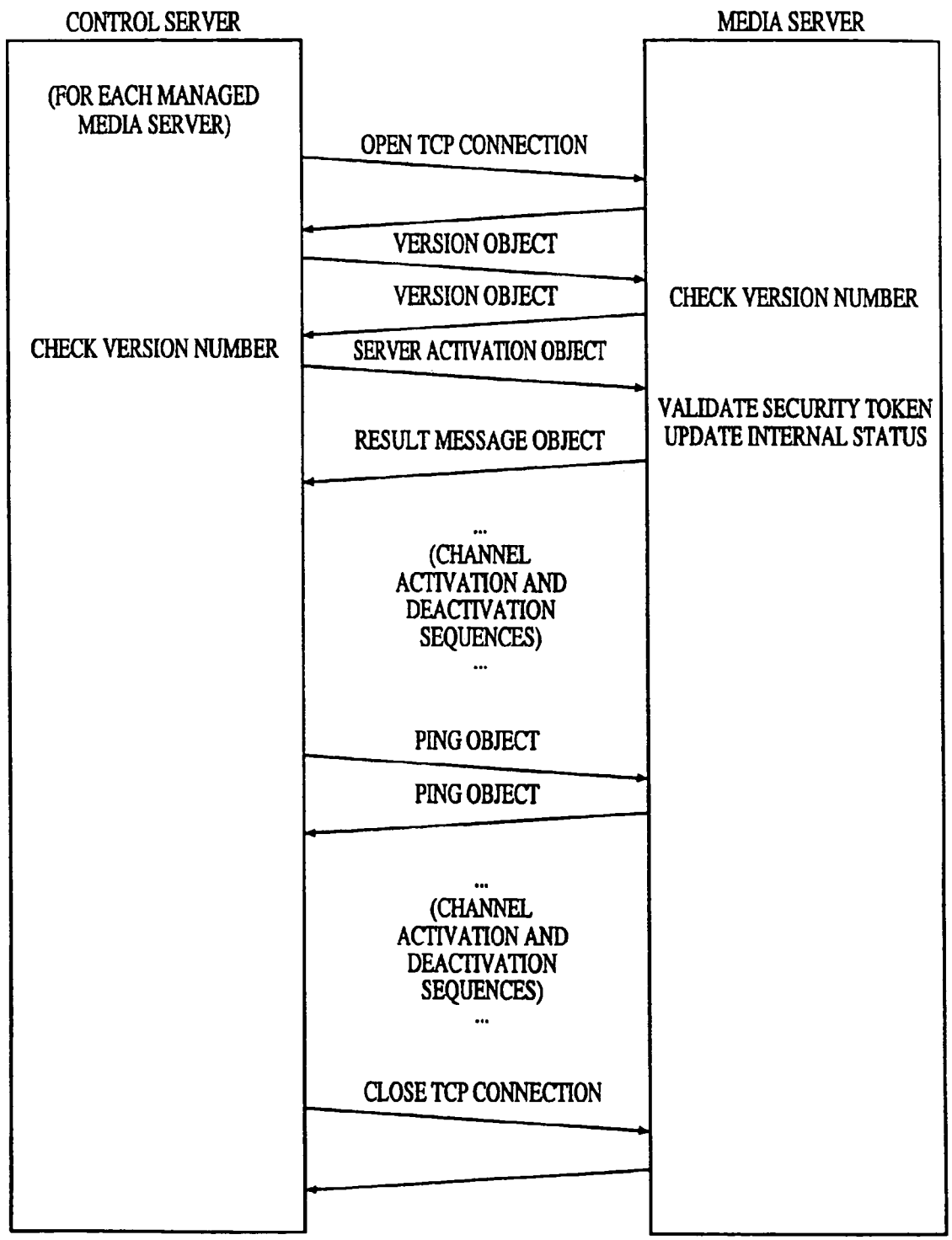

The process by which a Control Server activates the Media Servers that it manages is illustrated in FIG. 13. The Control Server sends a Server Activation Object to the Media Server indicating that it is responsible for channel management. This TCP connection between the Control Server and the Media Server stays open during the time that both servers are active. The Control Server periodically sends Ping Objects to the Media Server across this open TCP connection to verify that the Media Server is still running.

Figure 14:
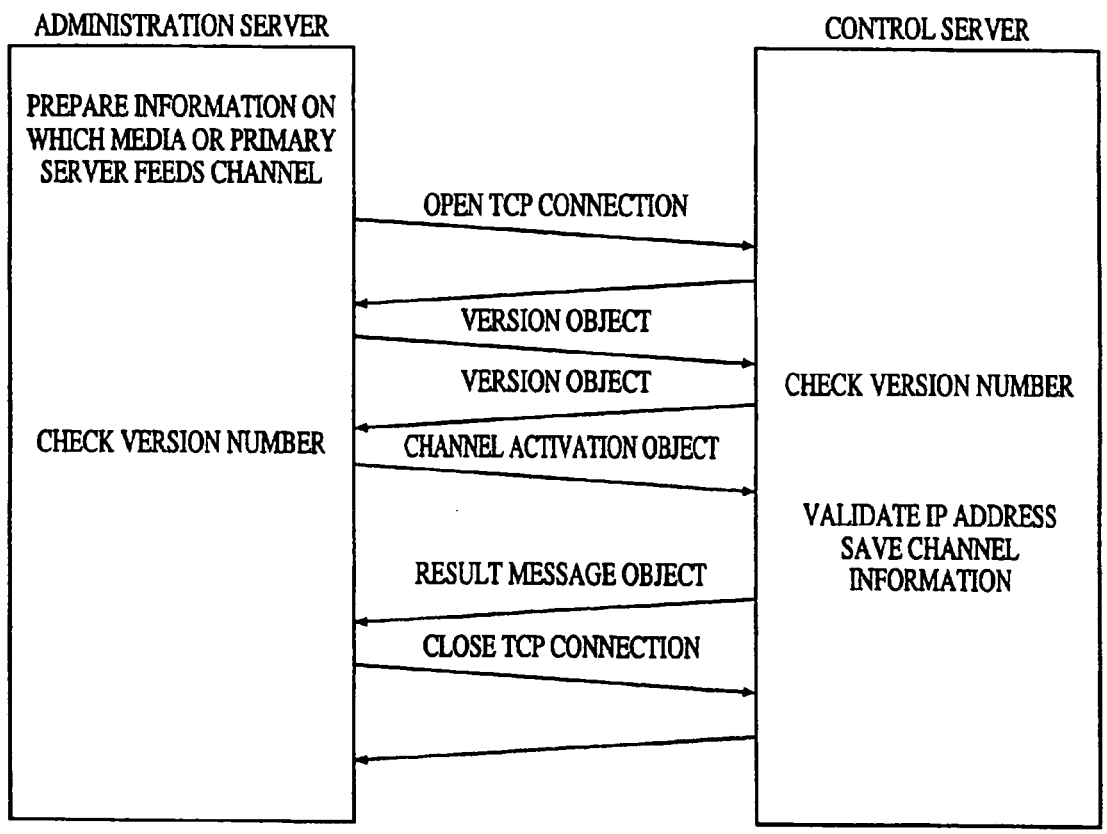

FIG. 14 illustrates the process by which a given channel is activated by the Administration Server. The Administration Server opens a connection to a Control Server that its wishes to have carry a given channel and provide a Channel Activation Object. This object indicates to the Control Server the Media or Primary Server from which the Control Server should direct its Media Servers to get the feed. At this point the Control Server is said to be carrying that channel and it will be a valid host on a list of Control Servers requested by a Channel Play sequence.

Figure 15:
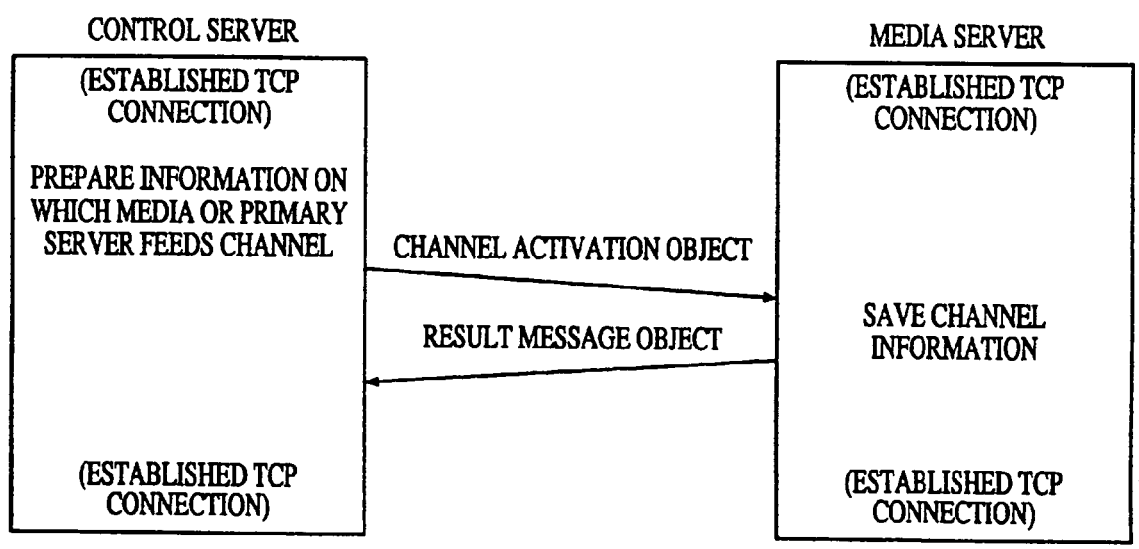

FIG. 15 illustrates what happens when a Control Server needs to provide a channel. First it sends a Channel Activation Object to one of the Media Servers that it manages across the open TCP connection described previously. This object indicates to the Media Server that it should start receiving the channel identified and from where it should receive it.

Figure 16A:
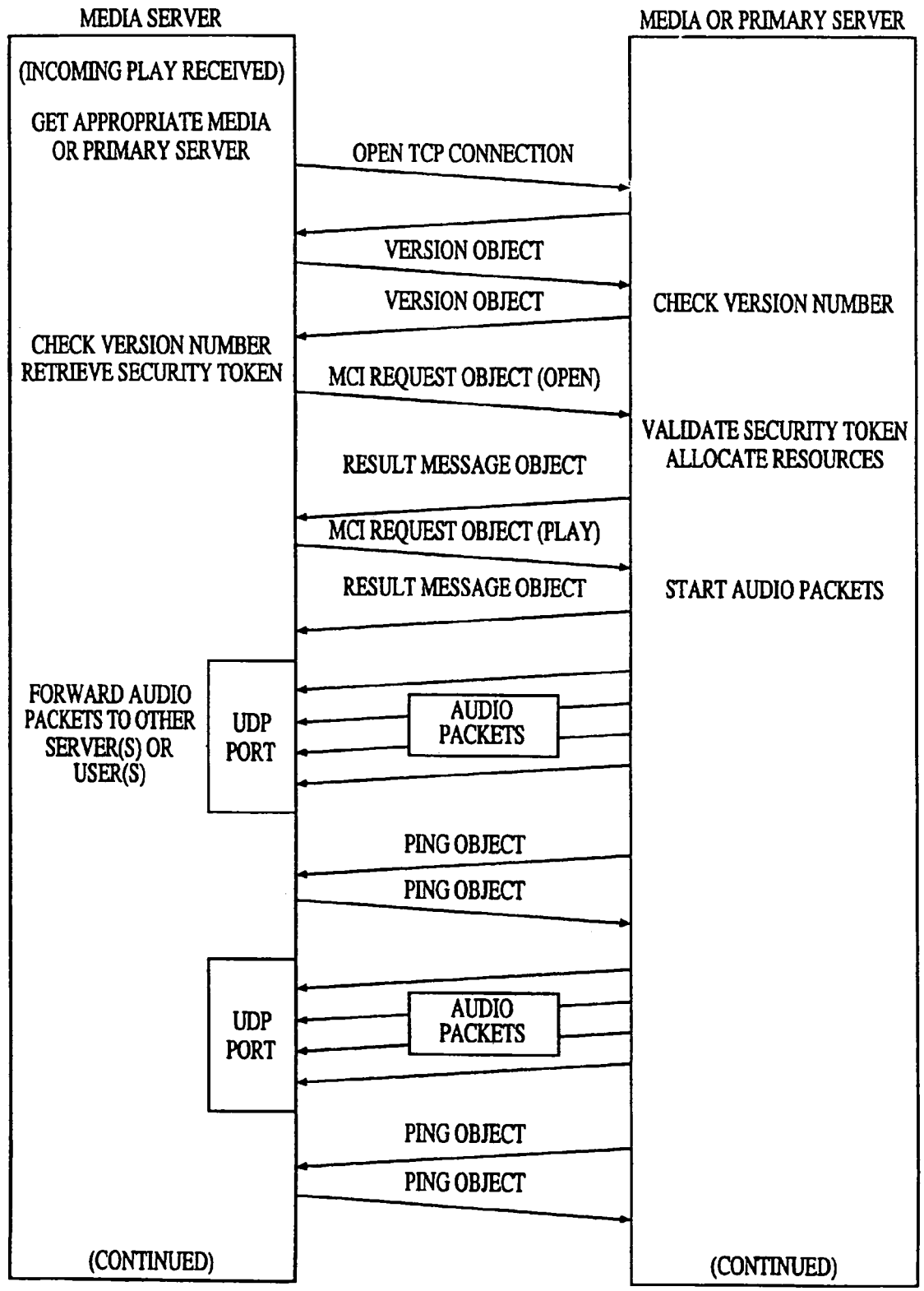
Figure 16B:
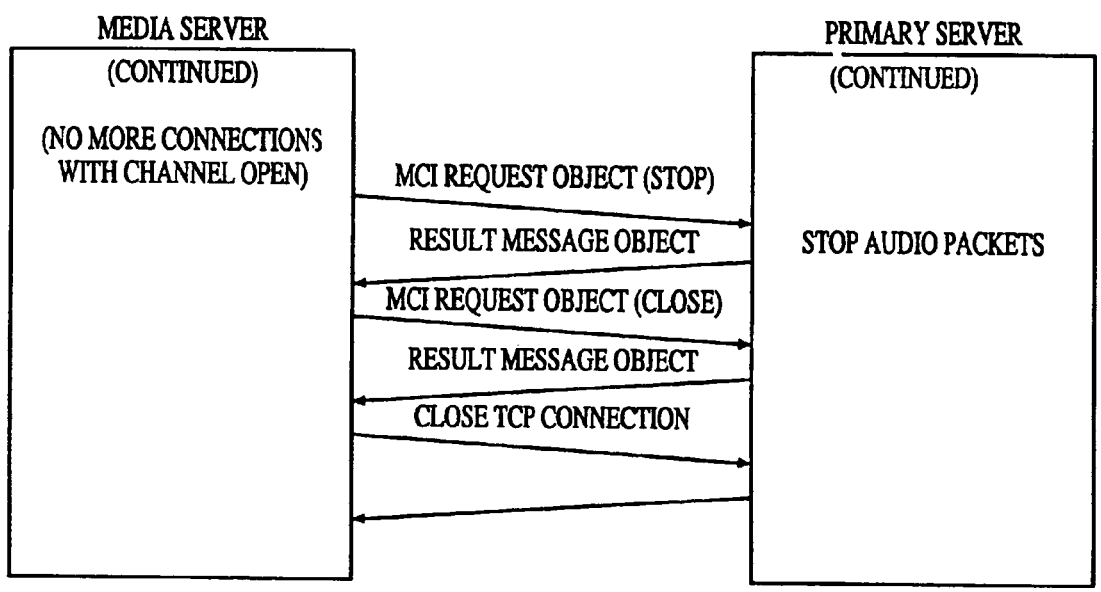

In FIGS. 16A and 16B depict how the Media Server requests distribution of an audio channel from another Media Server or from a Primary Server. This sequence is much the same as that in which a User requests the distribution of audio information from a Media Server. Note that a Media Server receives a single incoming stream for each channel that it is carrying and then redistributes this stream to all Users or other Media Servers that request it.

Figure 17:
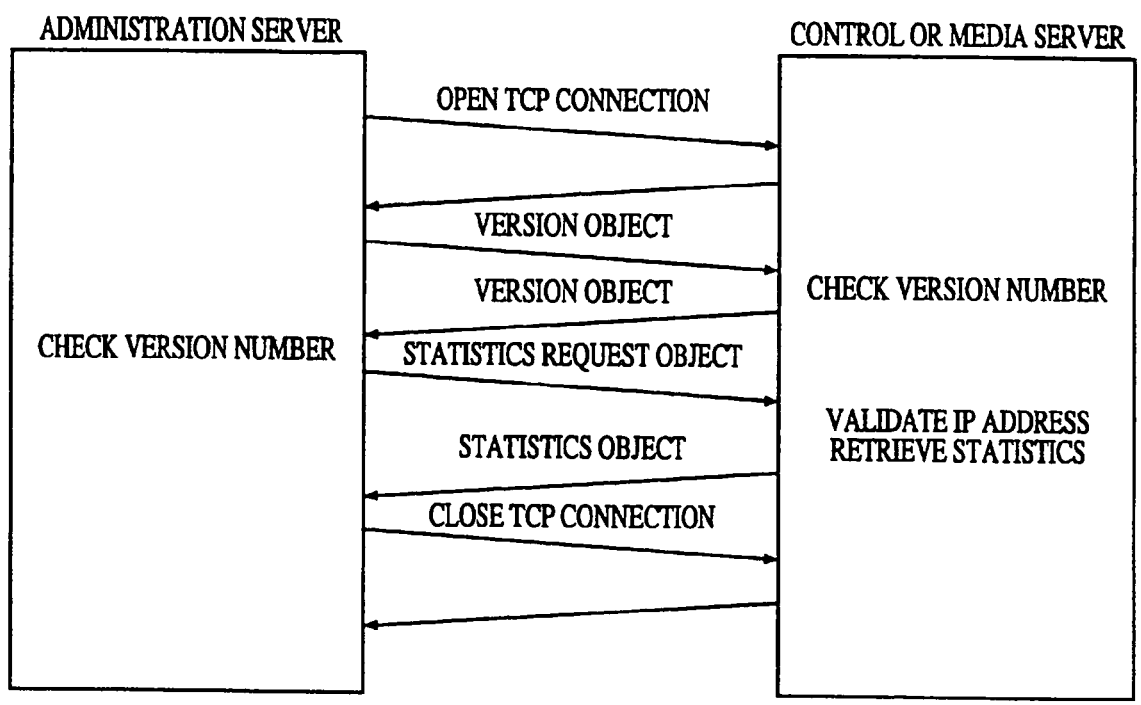

Finally, FIG. 17 illustrates the statistics request sequence. This sequence is used by the Administration Server to gather information from the Media Servers and Control Servers in order to manage the overall system. It can use this information to detect failures and to balance load as the dynamic conditions change. As indicated above, it can also use this information to monitor which Users are listening to which channel or whether Users stop listening to a channel at any time, such as during the play of a particular song. It can also use this information to control the advertising content that is downloaded to a particular User in advance of receipt of regular audio programming and/or monitor the delivery of advertising to the Users.

The control architecture described in this section is scalable to handle any number of Users. Note that the User registration process only happens once for each subscriber and the login process only happens once per session. These interactions, which require the Administration Server, are expected to constitute a very small percentage of the overall system bandwidth. If the Administration Server were to become a bottleneck, however, it would be possible to duplicate it and to have the database it maintains distributed and automatically updated to guarantee consistency.

The Control Servers are distributed throughout the network and can handle the lower level interactions with the Users and the Media Servers. A single Control Server can handle preferably on the order of ten Media Servers up to several hundred Users. The bitrate among the Users, the Control Servers and the Media Servers is expected to be small in comparison to the audio transmission bitrate. The Ping Objects normally only involve the User and the nearest Media Server. They are also low in overhead since they are small and only get transmitted infrequently.

III. User Interface

The User interface is provided by the client application running on an individual computer and its associated graphical interface. In the preferred embodiment the User interface is available for 32-bit Windows (95 and NT), Macintosh and UNIX platforms. Preferably anyone on the Internet can freely download a copy of the client software and install it in their computer.

Figure 18:
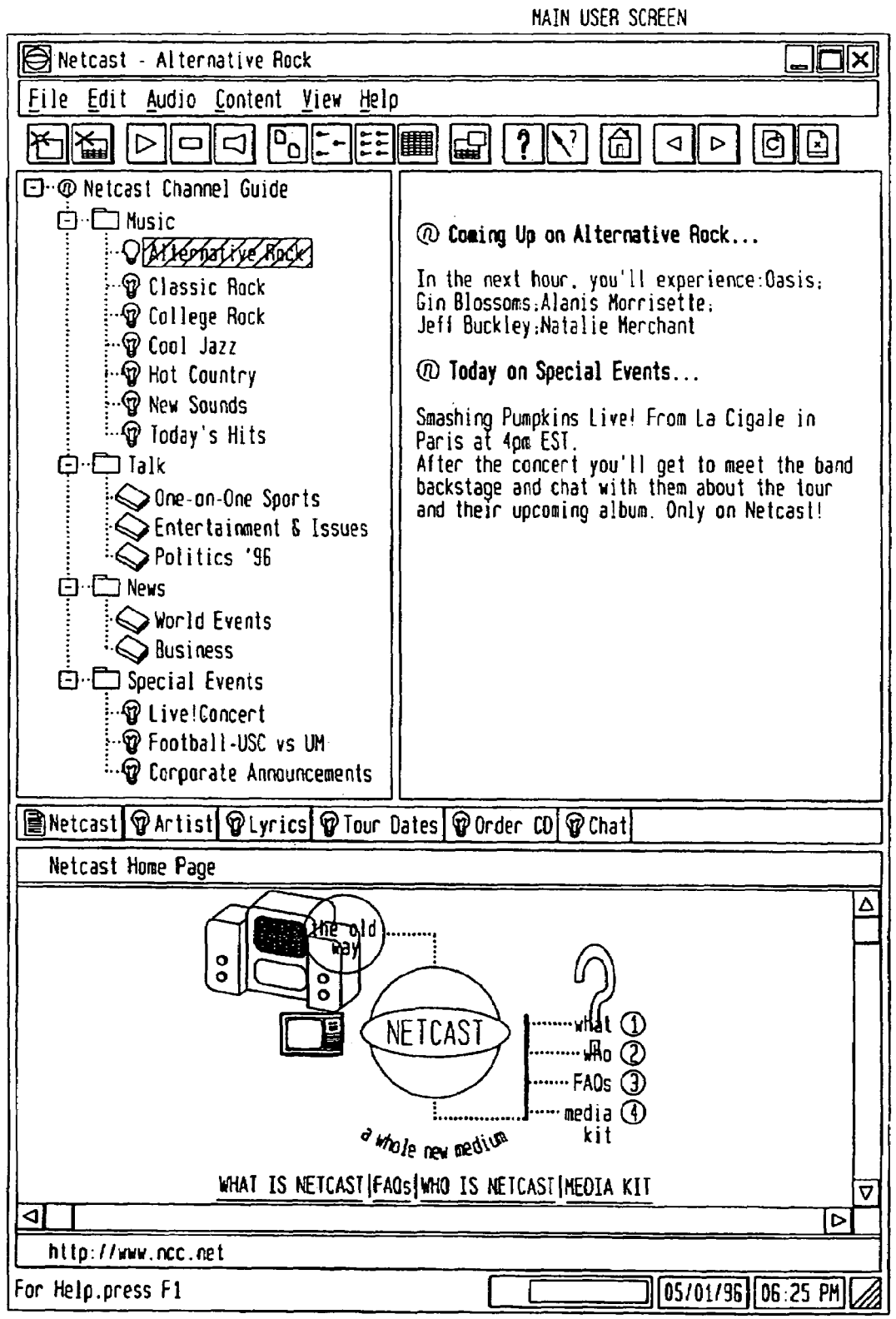
FIGS. 18 and 19 depict the user interface for control of the system of FIG. 1.

FIG. 18 illustrates the main User screen in the preferred embodiment. The screen is composed of three sections: channel guide (upper left frame), program guide (upper right frame), and multimedia frame (lower half of screen). The channel guide lists, as a tree hierarchy, the channels that are available from the system. The User selects a channel from the list of those displayed on the channel guide. The program guide provides information pertaining to the channel selected. This information can be a detailed schedule of the programming that has played or will be playing on the channel selected. Additionally, other relevant information will be displayed in this frame, for example, a notice regarding an upcoming special event on another channel. The multimedia frame provides an integrated web browser that displays information via a series of tabbed sections.

The information contained in the channel guide, program guide, and the tabs of the multimedia frame is dynamically transmitted to the client. For example, if a new channel begins operation, the client application can immediately display it as being available. Furthermore, the tabs displayed can be specifically relevant depending on what song is playing. For example, tabs displaying the album cover, information on the artist, song lyrics, tour dates can be displayed. Additionally, as shown in the example in FIG. 18, a tab can be available allowing the User to place an order for the CD or allowing the User to participate in a chat session related to the channel.

Figure 19:
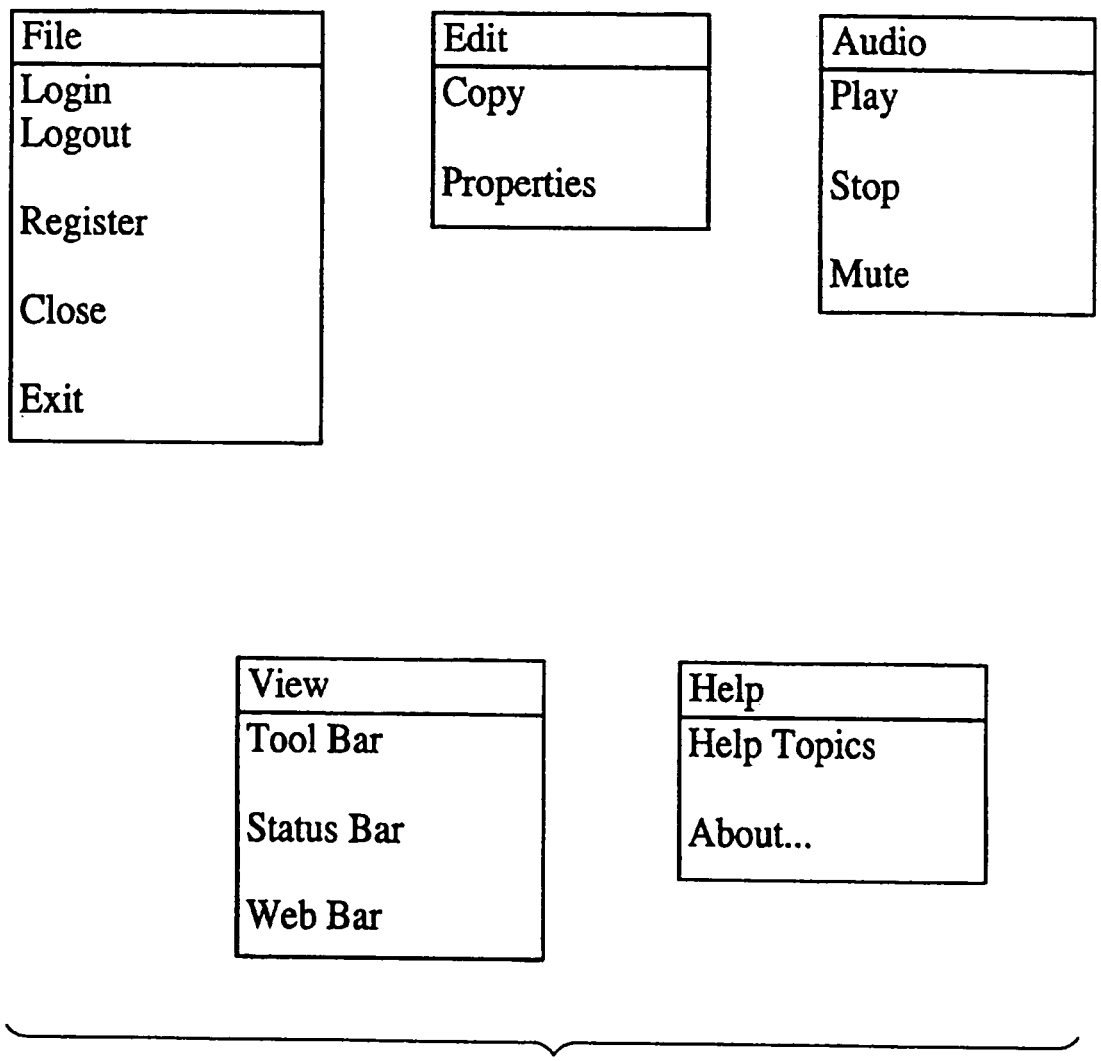

FIG. 19 illustrates the key pull-down menus available in the main User screen in the preferred embodiment. Table 3 provides a description of each of the functions available through the pull down menus, as shown in FIG. 19.

As will be apparent to those skilled in the art, numerous modifications may be made within the spirit and scope of the invention.

TABLE 3

Pull-Down Menu Functions

| Menu Choice | Menu Sub-Choice | Description |
| --- | --- | --- |
| File | Login | Allows the User to login to the system. |
|  | Logout | Allows the User to logout from the system. |
|  | Register | Brings up a dialog so that the User can register with the system for the first time. |
|  | Close | Minimizes the screen. |
| Edit | Copy | Allows the User to copy the selection on to the clipboard. |
|  | Properties | Allows the User to set various properties. |
| Audio | Play | Begins playing the selected channel. |
|  | Stop | Stops playing the selected channel. |
|  | Mute | Stops the playing of audio |
| View | Tool Bar | Display or hide the tool bar (providing access to pull-down menu functions). |
|  | Status Bar | Display or hide the status bar normally situated at bottom of the screen. |
|  | Web Bar | Display or hide the tool bar section that provides access to the web browser functions. |
| Help | Help Topics | Brings up a list of available online help topics. |
|  | About . . . | Displays summary information regarding this application, such as version number, copyright information, and so on. |

What is claimed is:

1. A system for streaming a continuous sequence of individual pieces of information over a communications network to a group of users that selected a particular channel, the system comprising:

at least one server adapted to transmit the continuous sequence of individual pieces of information at approximately the same time to each user in the group that selected the particular channel, wherein the individual pieces of information include audio information;

an application that generates a user interface screen adapted to allow a user to initiate a purchase of a product, the user interface screen including:
   a channel guide that includes a list of available channels of audio; and
   a program guide that provides information relating to the particular channel; and
at least one server adapted to maintain an audit log that records data indicative of at least one of:
   how many users listened to the particular channel; or
   times at which the users listened to the particular channel.

2. The system of claim 1, wherein membership in the group of users is dynamic.

3. The system of claim 1, wherein a user in the group can start and stop listening to the particular channel at any time.

4. The system of claim 1, wherein the application is a client application that is configured to be downloaded over the communications network and installed on user computers.

5. The system of claim 1, wherein the product is a CD that is relevant to the audio information being transmitted.

6. The system of claim 1, wherein the user interface screen includes a link to facilitate the purchase.

7. The system of claim 1, wherein the product is relevant to the audio information that is being transmitted.

8. The system of claim 1, wherein the audit log records data indicative of how many users listened to the particular channel and times at which the users listened to the particular channel.

9. The system of claim 1, wherein the user interface screen is adapted to allow a user in the group to initiate two-way interaction with at least one other user in the group.

10. The system of claim 9, wherein the two-way interaction allows the user and the at least one other user to chat.

11. The system of claim 9, wherein the two-way interaction allows the user and the at least one other user to chat about the particular channel.

12. The system of claim 9, wherein the user interface screen includes a link to facilitate the two-way interaction during the transmission of the audio information.

13. The system of claim 1, wherein the user interface screen is adapted to allow a display of tour dates.

14. The system of claim 1, wherein the user interface screen further includes information selected from the group consisting of an album cover, artist information, song lyrics, and tour dates.

15. The system of claim 1, wherein the information provided in the program guide relates to audio information that will be playing on the particular channel.

16. The system of claim 1, wherein the information provided in the program guide is dynamically transmitted to the application.

17. The system of claim 1, wherein the available channels include at least one of music, talk radio, news, special events, concerts, sports broadcasts, or corporate announcements.

18. The system of claim 1, wherein the available channels include channels featuring different types of music.

19. The system of claim 1, further comprising at least one server adapted to control the routing of the individual pieces of information in response to selection signals received from the users.

20. The system of claim 19, further comprising multiple servers to transmit the continuous sequence of individual pieces of information at approximately the same time to each user in the group, wherein the multiple servers that transmit the information are configured to be scalable so that any number of users can receive the audio information.

21. The system of claim 1, further comprising multiple servers to control the routing of the individual pieces of information in response to selection signals received from the users, wherein the multiple servers that control the routing are configured to be scalable so that any number of users can receive the audio information.

22. The system of claim 1, wherein the audit log records data indicative of how many users listened to the particular channel and data indicative of how many users are stored in a database.

23. The system of claim 1, further comprising at least one server adapted to send advertising information to at least one of the users in the group.

24. The system of claim 23, wherein the advertising information includes content that is varied.

25. The system of claim 24, wherein the content is varied based on demographics.

26. The system of claim 24, wherein the content is varied based on the particular channel.

27. The system of claim 23, wherein the advertising information is incorporated into the continuous sequence of individual pieces of information.

28. The system of claim 23, wherein the advertising information is incorporated into a separate stream of information, and the separate stream is transmitted before the audio information and stored in a memory of a computer operated by a user in the group and then inserted into the audio information upon the receipt of a cueing signal by the computer.

29. The system of claim 1, wherein the audio associated with each of the available channels comprises an independent continuous sequence of information.

30. The system of claim 1, wherein the user interface screen is adapted to allow a user to play, stop and mute the audio information.

31. A method for streaming a continuous sequence of individual pieces of information over a communications network to a group of users that selected a particular channel comprising the steps of:
   transmitting the continuous sequence of individual pieces of information at approximately the same time to each user in the group that selected the particular channel, wherein the individual pieces of information include audio information;
   providing an application that generates a user interface screen adapted to allow a user to initiate a purchase of a product, the user interface screen including:
      a channel guide that includes a list of available channels of audio; and
      a program guide that provides information relating to the particular channel; and
   maintaining an audit log that records data indicative of at least one of:
      how many users listened to the particular channel; or
      times at which the users listened to the particular channel.

32. The method of claim 31, wherein the product is a CD that is relevant to the audio information being transmitted.

33. The method of claim 31, wherein the audit log records data indicative of how many users listened to the particular channel and the times at which the users listened to the particular channel.

34. The method of claim 33, further comprising storing in a database data indicative of how many users listened to the particular channel.

35. The method of claim 31, wherein the user interface screen is adapted to allow a user to chat with at least one other user in the group.

36. The method of claim 31, wherein the user interface includes information selected from the group consisting of: an album cover, artist information, song lyrics, and tour dates.

37. The method of claim 31, wherein the available channels include channels featuring different types of music, and the user interface screen is adapted to allow a user to play, stop and mute the audio information.

38. The method of claim 31, further comprising controlling the routing of the individual pieces of information in response to selection signals received from the users.

39. The method of claim 31, further comprising transmitting advertising information to at least one of the users in the group.

40. The method of claim 39, wherein the advertising information includes content that is varied.

41. A method for making available a plurality of media streams, wherein each of the media streams comprises an independent continuous sequence of individual pieces of information, comprising the steps of:
    transmitting the media streams, wherein a particular media stream of the media streams is transmitted at approximately the same time to a group, wherein the group comprises a set of all users that selected the particular media stream;
    providing an application that generates a user interface screen including:
        a channel guide that includes a list of available media streams; and
        side-bar information containing data selected from the group consisting of graphics, images and text; and
    maintaining a database that includes data indicative of at least one of:
        the media streams selected by the users;
        how many users listened to the selected media streams; or
        times at which users listened to the selected media streams.

42. The method of claim 41, wherein the media streams include different types of music, and the user interface screen is adapted to allow a user to play, stop and mute the music.

43. The method of claim 42, wherein the side-bar information is synchronized with the different types of music and includes images relating to an album cover and artist information.

44. The method of claim 41, further comprising providing a plurality of servers that are adapted to transmit the plurality of media streams.

45. The method of claim 44, further comprising selecting one or more of the plurality of servers to transmit the media streams in response to selection signals received from the users.

46. The method of claim 41, wherein the side-bar information relates to an album cover.

47. The method of claim 41, wherein the side-bar information relates to artist information.

48. The method of claim 41, wherein the side-bar information relates to tour dates.

49. The method of claim 41, wherein the side-bar information relates to song lyrics.

50. The method of claim 41, wherein the side-bar information relates to a URL.

51. The method of claim 45, wherein the user interface screen is adapted to allow a user to initiate a purchase of a product.

52. The method of claim 51, wherein the product is a CD that is relevant to at least one of the plurality of media streams being transmitted.

53. The method of claim 41, wherein the user interface screen is adapted to allow a user to initiate two-way interaction that allows users to chat.

54. The method of claim 41, further comprising transmitting advertising information to at least one of the users in the group.

55. The method of claim 54, wherein the advertising information includes content that is varied.

56. A system for streaming a continuous sequence of individual pieces of audio information over a communications network to a group of users that selected a particular channel, the system comprising:
    at least one server adapted to transmit the continuous sequence of individual pieces of audio information at approximately the same time to each user in the group that selected the particular channel;
    at least one server adapted to maintain an audit log that records data indicative of how many users listened to the particular channel;
    a client application that generates a user interface screen including:
        a channel guide that includes a list of available channels of audio, wherein the available channels include channels featuring different types of music;
        a program guide that provides information relating to the particular channel; and
        a frame adapted to allow a user to initiate a purchase of a product.

57. The system of claim 56, wherein the client application is configured to be downloaded over the communications network and installed on user computers.

58. The system of claim 56, wherein a user in the group can start and stop listening to the particular channel at any time.

59. The system of claim 58, wherein the product is a CD that is relevant to the audio information being transmitted.

60. The system of claim 56, wherein the user interface screen is adapted to allow a user to initiate two-way interaction that allows users to chat, and the user interface screen is further adapted to allow the user to play, stop and mute the audio information.

61. The system of claim 56, wherein the user interface screen further includes information selected from the group consisting of: an album cover, artist information, song lyrics, and tour dates.

62. The system of claim 56, further comprising at least one server adapted to control the routing of the individual pieces of audio information in response to selection signals received from the users.

63. The system of claim 56, wherein data indicative of how many users are stored in a database.

64. The system of claim 56, further comprising at least one server adapted to send advertising information to the users.

65. The system of claim 64, wherein the advertising information includes content that is varied.

66. A system for streaming a continuous sequence of individual pieces of audio information over a communications network to a group of users that selected a particular channel, the system comprising:

a plurality of servers adapted to transmit the continuous sequence of individual pieces of audio information at approximately the same time to each user in the group that selected the particular channel;

at least one server adapted to maintain an audit log that records data indicative of how many users listened to the particular channel, wherein the data are stored in a database;

a client application that generates a user interface screen including:

a channel guide that includes a list of available channels of audio, wherein the available channels include channels featuring different types of music;

side-bar information containing data selected from the group consisting of: an album cover, artist information and a URL; and a frame adapted to allow a user to initiate a purchase of a product.

67. The system of claim 66, wherein the client application is configured to be downloaded over the communications network and installed on user computers.

68. The system of claim 66, wherein the side-bar information is synchronized with the audio information.

69. The system of claim 66, wherein the side-bar information includes data regarding the album cover, the artist information, and the URL.

70. The system of claim 66, wherein the product is a CD that is relevant to the audio information being transmitted.

71. The system of claim 66, wherein the user interface screen is adapted to allow a user to initiate two-way interaction for users to chat.

72. The system of claim 66, further comprising at least one server adapted to select one or more of the plurality of servers to transmit the audio information in response to selection signals received from the users.

73. The system of claim 72, wherein the plurality of servers are configured to be scalable so that any number of users can receive the audio information.

74. The system of claim 66, further comprising at least one server adapted to send advertising information to the users.

75. A system for streaming multiple channels of audio information over a communications network, the system comprising:

a plurality of servers adapted to transmit the multiple channels of audio information, each channel including an independent continuous sequence of individual pieces of information and said plurality of servers configured so that the audio information for a particular channel of the multiple channels is transmitted at approximately the same time to a group, wherein the group comprises a set of all users that selected the particular channel;

at least one server adapted to route the audio information by selecting one or more of the plurality of servers in response to selection signals received from the users;

a client application that generates a user interface screen including:

a channel guide that includes a list of the multiple channels of audio information, wherein the multiple channels include channels featuring different types of music; and a program guide that provides information relating to a selected channel.

76. The system of claim 75, wherein a user can select any of the multiple channels and can start and stop listening to the particular channel at any time.

77. The system of claim 75, wherein the user interface screen further includes a frame adapted to allow a user to initiate a purchase of a product.

78. The system of claim 77, wherein the product is a CD that is relevant to the audio information being transmitted.

79. The system of claim 77, wherein the product that may be purchased is relevant to the audio information that is being transmitted.

80. The system of claim 75, wherein the user interface screen is adapted to allow a user to initiate two-way interaction that allows users to chat.

81. The system of claim 75, wherein the user interface screen further includes information selected from the group consisting of an album cover, artist information, song lyrics, and tour dates, and the user interface screen is further adapted to allow the user to play, stop and mute the audio information.

82. The system of claim 75, wherein the plurality of servers are configured to be scalable so that any number of users can receive the audio information.

83. The system of claim 82, further comprising at least one server adapted to send advertising information to the users.

84. The system of claim 83, wherein the advertising information includes content that is varied.

85. A system for streaming audio information over a communications network, the system comprising:

multiple channels of audio information, each channel of the multiple channels including an independent continuous sequence of individual pieces of information;

at least one server adapted to transmit the audio information of each channel, said server configured so that the audio information for a particular channel of the multiple channels is transmitted at approximately the same time to a group, wherein the group comprises a set of all users that selected the particular channel;

an application that generates a user interface screen adapted to allow a user to initiate a purchase of a product, the user interface screen including:

a channel guide that includes a list of the multiple channels available to the user, wherein the channels include different types of music; and a program guide that provides information relating to a channel selected by the user; and at least one server adapted to maintain an audit log that records data indicative of at least one of:

the channels selected by the users;

how many users listened to the selected channels; or times at which users listened to the selected channels.

86. The system of claim 85, wherein a user can select any of the multiple channels and can start and stop listening to the selected channel at any time.

87. The system of claim 85, wherein the product is a CD that is relevant to the audio information being transmitted.

88. The system of claim 85, wherein the audit log records data indicative of the channels selected by the users, how many users listened to the selected channels, and the times at which users listened to the selected channels.

89. The system of claim 85, wherein the user interface screen is adapted to allow a user to initiate two-way interaction that allows the users to chat.

90. The system of claim 89, wherein the user interface screen further includes information selected from the group consisting of an album cover, artist information, song lyrics, and tour dates, and the user interface screen is further adapted to allow the user to play, stop and mute the audio information.

91. The system of claim 89, wherein the audio information is transmitted by a plurality of servers that are configured to be scalable so that any number of users can receive the audio information.

92. The system of claim 91, further comprising at least one server adapted to select one or more of the plurality of servers in response to selection signals received from the users.

93. The system of claim 92, wherein data indicative of how many users are stored in a database, and data indicative of the channels selected by the users are stored in the database.

94. The system of claim 92, further comprising at least one server adapted to send advertising information to the users.

95. The system of claim 94, wherein the advertising information includes content that is varied.

96. A system for streaming audio information over a communications network, the system comprising:
multiple channels of audio information, each channel of the multiple channels including an independent continuous sequence of individual pieces of information;
at least one server adapted to transmit the audio information of each channel, said server configured so that the audio information for a particular channel of the multiple channels is transmitted at approximately the same time to a group comprising a set of all users that selected the particular channel;
an application that generates a user interface screen adapted to allow a user to initiate a purchase of a product, the user interface screen including:
a channel guide that includes a list of the multiple channels available to the user, wherein the channels include different types of music; and
a program guide that provides information relating to a channel selected by the user; and
at least one server adapted to route the individual pieces of information in response to selection signals received from the users.

97. The system of claim 96, wherein a user can select any of the multiple channels and can start and stop listening to the selected channel at any time.

98. The system of claim 96, wherein the product is a CD that is relevant to the audio information being transmitted.

99. The system of claim 98, wherein the user interface screen is adapted to allow a user to initiate two-way interaction that allows the users to chat.

100. The system of claim 99, wherein the user interface screen further includes information selected from the group consisting of an album cover, artist information, song lyrics, and tour dates.

101. The system of claim 99, further comprising at least one server adapted to send advertising information to the users.

102. The system of claim 101, wherein the advertising information includes content that is varied.

103. The system of claim 99, wherein the audio information is transmitted by a plurality of servers that are configured to be scalable so that any number of users can receive the audio information.

104. A system for streaming a continuous sequence of individual pieces of audio information over a communications network to a group of users that selected a particular channel, the system comprising:
at least one server adapted to transmit the continuous sequence of individual pieces of audio information at approximately the same time to each user in the group that selected the particular channel;
an application that generates a user interface screen adapted to allow a user to initiate two-way interaction allowing the user to chat and further adapted to allow the user to initiate a purchase of a CD that is relevant to the audio information being transmitted, the user interface screen including:
a channel guide that includes a list of available channels of audio information, wherein the channels include different types of music; and
a program guide that provides information relating to the particular channel; and
at least one server adapted to maintain an audit log that records data indicative of at least one of:
how many users listened to the particular channel; or
times at which users listened to the particular channel.

105. The system of claim 104, wherein the user interface screen further includes information selected from the group consisting of: an album cover, artist information, song lyrics, and tour dates.

106. The system of claim 104, further comprising at least one server adapted to control the routing of the individual pieces of audio information in response to selection signals received from the users.

107. The system of claim 104, further comprising at least one server adapted to send advertising information to the users.

108. The system of claim 107, wherein the advertising information includes content that is varied.

109. A system for streaming a continuous sequence of individual pieces of audio information over a communications network to a group of users that selected a particular channel, the system comprising:
at least one server adapted to transmit the continuous sequence of individual pieces of audio information at approximately the same time to each user in the group that selected the particular channel;
an application that generates a user interface screen adapted to allow a user in the group to initiate two-way interaction allowing the user to chat and further adapted to allow the user to initiate a purchase of a CD that is relevant to the audio information being transmitted, the user interface screen including:
a channel guide that includes a list of available channels of audio information, wherein the channels include different types of music; and
a program guide that provides information relating to the particular channel; and
at least one server adapted to route the individual pieces of audio information in response to selection signals received from the users.

110. The system of claim 109, wherein the user interface screen further includes information selected from the group consisting of: an album cover, artist information, song lyrics, and tour dates, and wherein a user in the group can start and stop listening to the particular channel at any time.

111. The system of claim 110, wherein the audio information is transmitted by a plurality of servers that are configured to be scalable so that any number of users can receive the audio information.

112. The system of claim 110, further comprising at least one server adapted to send advertising information to the users.

113. The system of claim 112, wherein the advertising information includes content that is varied.

114. A system for streaming audio over a communications network, the system comprising:
- at least one server configured to transmit a continuous sequence of packets containing audio information, wherein the continuous sequence of packets is transmitted at approximately the same time to each of multiple user computers;
- a software application configured to be loaded onto each of the user computers, wherein the software application contains instructions for generating a user interface comprising:
  - a channel guide that includes a list of available channels of audio information; and
  - a program guide that provides program information for at least one of the available channels; and
- at least one server configured to record which user computers received the audio information, which of the available channels were received, or times at which any of the available channels were received.

115. The system of claim 114, wherein the user interface further comprises an order placing feature that allows users of the multiple user computers to place an order for a product.

116. The system of claim 114, wherein the user interface further comprises a two-way interaction feature that allows users of the multiple user computers to participate in a chat session.

117. A method for streaming audio over a communications network, comprising the steps of:
- transmitting a continuous sequence of packets containing audio information, wherein the continuous sequence of packets is transmitted at approximately the same time to each of multiple user computers;
- providing a software application configured to be loaded onto each of the user computers, wherein the software application contains instructions for generating a user interface comprising:
  - a channel guide that includes a list of available channels of audio information; and
  - a program guide that provides program information for at least one of the available channels; and
- generating a database that includes data indicative of how many user computers received the audio information, which of the available channels were received, or times at which any of the available channels were received.

118. The method of claim 117, wherein the user interface further comprises an order placing feature that allows users of the multiple user computers to place an order for a product.

119. The method of claim 117, wherein the user interface further comprises a two-way interaction feature that allows users of the multiple user computers to participate in a chat session.

120. A system for streaming multiple channels of audio information over a communications network, the system comprising:
- a plurality of first servers configured to transmit the multiple channels of audio information, each channel including an independent continuous sequence of packets containing audio information, where said plurality of first servers are configured so that the audio information for a particular channel is transmitted at approximately the same time to each of multiple user computers that requested the particular channel;
- at least one second server adapted to route the audio information to the user computers through selected first servers of said plurality of first servers in response to selection signals received from the user computers; and
- a software application configured to be loaded onto each of the user computers, wherein the software application contains instructions for generating a user interface comprising:
  - an order placing feature that allows users of the multiple user computers to place an order for a product;
  - a channel guide that includes a list of the multiple channels, wherein the multiple channels include channels featuring different types of music; and
  - a program guide that provides program information relating to a particular channel of the multiple channels.

121. The system of claim 120, wherein the user interface further comprises a two-way interaction feature that allows users of the multiple user computers to participate in a chat session.

122. A system for streaming a continuous sequence of packets of audio information over a communications network, the system comprising:
- at least one server configured to transmit the packets at approximately the same time to each of multiple user computers;
- a software application configured to be loaded onto each of the user computers, wherein the software application contains instructions for generating a user interface comprising:
  - an order placing feature that allows users of the multiple user computers to place an order for a CD that is relevant to the audio information;
  - a two-way interaction feature that allows users of the multiple user computers to participate in a chat session;
  - a channel guide that includes a list of available channels of audio information; and
  - a program guide that provides program information for at least one of the available channels; and
- at least one server configured to record which user computers received the audio information, which of the available channels were received, or times at which any of the available channels were received.

123. The system of claim 122, further comprising at least one server adapted to route the packets in response to selection signals received from the user computers.

124. A system for streaming audio information over a communications network, the system comprising:
- multiple channels of audio information, each channel of the multiple channels including an independent continuous sequence of individual pieces of information;
- at least one server adapted to transmit the audio information of each channel, said server configured so that the audio information for a particular channel of the multiple channels is transmitted at approximately the same time to a group comprising a set of all users that selected the particular channel;
- an application that generates at least one user interface screen adapted to allow a user to initiate a purchase of a product; and
- at least one server adapted to maintain an audit log that records data indicative of at least one of:
  - the channels selected by the users;
  - how many users listened to the selected channels; or
  - times at which users listened to the selected channels.

125. The system of claim 124, wherein a user can select any of the multiple channels and can start and stop listening to the selected channel at any time.

126. The system of claim 124, wherein the product that may be purchased is relevant to the audio information that is being transmitted.

127. The system of claim 124, wherein the at least one user interface screen is adapted to allow a user to initiate two-way interaction that allows the users to chat.

128. The system of claim 124, further comprising at least one server adapted to send advertising information to the users.

129. A system for streaming audio information over a communications network, the system comprising:

multiple channels of audio information, each channel of the multiple channels including an independent continuous sequence of individual pieces of information;

at least one server adapted to transmit the audio information of each channel, said server configured so that the audio information for a particular channel of the multiple channels is transmitted at approximately the same time to a group comprising a set of all users that selected the particular channel;

an application that generates at least one user interface screen adapted to allow a user to initiate a purchase of a product; and at least one server adapted to route the individual pieces of information in response to selection signals received from the users.

130. The system of claim 129, wherein a user can select any of the multiple channels and can start and stop listening to the selected channel at any time.

131. The system of claim 129, wherein the product is a CD that is relevant to the audio information being transmitted.

132. The system of claim 129, wherein the at least one user interface screen is adapted to allow a user to initiate two-way interaction that allows the users to chat.

133. The system of claim 129, further comprising at least one server adapted to send advertising information to the users.

134. The system of claim 129, wherein the audio information is transmitted by a plurality of servers that are configured to be scalable so that any number of users can receive the audio information.

135. The system of claim 134, wherein the at least one server adapted to route selects one or more of the plurality of servers in response to the selection signals received from the users.

* * * * *